United States Patent
Gerteis et al.

(10) Patent No.: US 11,420,212 B2
(45) Date of Patent: Aug. 23, 2022

(54) METHODS AND DEVICES FOR CONTROLLING THE DRY GRANULATION PROCESS

(71) Applicant: Paul Gerteis, Wollerau (CH)

(72) Inventors: Paul Gerteis, Wollerau (CH); Robert Frank Lammens, Leverkusen (DE)

(73) Assignee: Paul Gerteis, Wollerau (CH)

( * ) Notice: Subject to any disclaimer, the term of this patent is extended or adjusted under 35 U.S.C. 154(b) by 336 days.

(21) Appl. No.: 16/344,750

(22) PCT Filed: Oct. 23, 2017

(86) PCT No.: PCT/EP2017/077035
§ 371 (c)(1),
(2) Date: Apr. 24, 2019

(87) PCT Pub. No.: WO2018/077818
PCT Pub. Date: May 3, 2018

(65) Prior Publication Data
US 2019/0329266 A1   Oct. 31, 2019

(30) Foreign Application Priority Data
Oct. 24, 2016   (EP) ..................................... 16195380

(51) Int. Cl.
*B02C 25/00* (2006.01)
*B01J 2/22* (2006.01)
(Continued)

(52) U.S. Cl.
CPC .................. *B02C 25/00* (2013.01); *B01J 2/22* (2013.01); *B02C 23/16* (2013.01); *B02C 23/38* (2013.01); *B02C 2023/165* (2013.01)

(58) Field of Classification Search
CPC ....... B02C 25/00; B02C 23/16; B02C 23/163; B02C 23/38
See application file for complete search history.

(56) References Cited

U.S. PATENT DOCUMENTS

| 5,509,612 A | 4/1996 | Gerteis |
|---|---|---|
| 2004/0166248 A1 | 8/2004 | Hu et al. |

(Continued)

FOREIGN PATENT DOCUMENTS

| DE | 101 32 067 | 1/2003 |
|---|---|---|
| EP | 1084820 A1 | 3/2001 |

(Continued)

OTHER PUBLICATIONS

DE 101 32 067, Buhler AG., "Method for monitoring the condition of continuously operating mill drums has a sound pick up system and filter bank to compare the emitted sound with reference values," Jan. 16, 2003, English language machine translation of abstract, Espacenet, date obtained: Jul. 23, 2019, 1 page. <https://worldwide.espacenet.com/publicationDetails/biblio?CC=DE&NR=10132067A1&KC=A1&FT=D&ND=3&date=20030116&DB=&locale=en_EP>.

(Continued)

*Primary Examiner* — Faye Francis
(74) *Attorney, Agent, or Firm* — Hoxie & Associates LLC

(57) ABSTRACT

The invention relates to a continuous dry granulation method and non-invasive monitoring and control of the dry granulation method. The invention further describes a dry granulation system and uses thereof. In particular, the non-invasive monitoring methods employ a sound, force, strain, vibration and/or acceleration sensor in order to determine the mechanical strength of a compacted material during a dry granulation process. Further, the compaction parameters of the compacting unit of the granulation process may be controlled to maintain a target mechanical strength of the compacted material.

28 Claims, 3 Drawing Sheets

(51) Int. Cl.
  *B02C 23/16* (2006.01)
  *B02C 23/38* (2006.01)

(56) References Cited

U.S. PATENT DOCUMENTS

| | | | |
|---|---|---|---|
| 2012/0119002 A1 | 5/2012 | Garbe | |
| 2014/0084092 A1* | 3/2014 | Braun | B02C 4/36 241/30 |
| 2016/0114331 A1* | 4/2016 | Young | B02C 13/09 241/37 |
| 2018/0243748 A1* | 8/2018 | Schmidt | B02C 25/00 |

FOREIGN PATENT DOCUMENTS

| | | |
|---|---|---|
| JP | 1982-016349 A | 1/1982 |
| JP | 2001-087897 A | 4/2001 |
| JP | 2002-095950 | 4/2002 |
| WO | WO 2008/057266 | 5/2008 |
| WO | WO 2009/135950 | 11/2009 |

OTHER PUBLICATIONS

International Search Report of International Patent Application PCT/EP2017/077035, prepared by the International Search Authority, dated Aug. 2, 2018.

Müller, Nicole. "Untersuchungen zur Prozessüberwachung und-regulierung bei der Walzenkompaktierung mittels Drehmomenterfassung an der Granuliereinheit". Diss. Universitäts—und Landesbibliothek Bonn, 2012, p. 1-129. (German language only).

Müller, Nicole. "Untersuchungen zur Prozessüberwachung und-regulierung bei der Walzenkompaktierung mittels Drehmomenterfassung an der Granuliereinheit". Diss. Universitäts—und Landesbibliothek Bonn, 2012, p. 1-129. (English language machine translation of abstract).

\* cited by examiner

METHODS AND DEVICES FOR CONTROLLING THE DRY GRANULATION PROCESS

CROSS-REFERENCE TO RELATED APPLICATIONS

This application is a United States Application under 35 U.S.C. 371 claiming benefit of PCT Application No. PCT/EP2017/077035, filed on Oct. 23, 2017, which claims priority to European Patent Application No. 16195380.7, filed Oct. 24, 2016, the contents of each of which are hereby incorporated by reference in their entireties.

BACKGROUND OF THE INVENTION

The invention is related to a method for monitoring and/or controlling a roller compactor dry granulation process, as well as a device for putting the method into effect.

Roller compactors, or roller compaction devices, are used in the preparation of granules, or granulates—more specifically so-called dry-granulates—and typically operate by first compacting powders of single or blended substances to ribbons or flakes between two counter rotating rolls, the size of which is then reduced in a subsequent milling step, thus resulting in the granulate. Usually, the milling unit of a roller compactor consists of one or more rotating and/or oscillating milling devices, frequently called granulators or rotors or milling rolls, which are mounted on shafts, and correspondingly one or more screens, each with a given aperture size (sieve size), which is mounted at a corresponding support. In general, the milling unit is attached to the process housing of the roller compactor. State of the art roller compactors are known for instance from EP 0525135 A1.

Upon dry granulation with roller compactors, changes, or fluctuations, in the quality of the granules generated with/from a given formulation may occur, even if they are made at the same roller compaction parameters (e.g. roll force, roll gap and roll speed). This is due to the fact that at the same roller compaction parameters, the apparent density and/or the mechanical strength of the compacted ribbons/flakes may vary from one batch to another due to differences in the compressibility (pressure required for achieving a given apparent density) and/or compactability (pressure required for achieving a given mechanical strength) of the powder to be roller compacted, causing a change of the properties of the obtained dry granulate both with respect to its particle size distribution (PSD) and its compaction/tableting properties. In general, changes in the compaction properties of the granules will result in serious problems upon tableting, whereas a change in the PSD may have an influence on the segregation properties of the granulate, leading to changes in dose uniformity and tablets' mechanical strength, and eventually to changes in shelf life and biopharmaceutical properties of tablets made from this granulate.

Now, from numerous tableting experiments, it could be concluded that in many cases a unique product- or at least batch-specific relation exists between the mechanical strength of a tablet and its overall apparent density. Since roller compaction is also a process in which a powder is densified, this unique relation also applies to the apparent density of a ribbon/flake or, more precisely, to its apparent density distribution.

Therefore, in order to level out differences in the compressibility of powders upon roller compaction, the roller compaction parameters—usually the roll force—should be adapted in such a way that ribbons/flakes with the same apparent overall density or, more precisely, the same apparent density distribution are made.

In many cases, in order to obtain granules with the same or practically the same tableting properties from one batch to another, adapting the force will suffice in order to make ribbons/flakes with the same mechanical strength or, more precisely, the same strength distribution, and consequently allow for preparing granules with the same particle size distribution (PSD) and tableting properties. As explained above, this is based on the fact that for a large number of granulates and powders, a relationship exists between the apparent density of a compact (e.g. a ribbon/flake or a tablet) and its mechanical strength which is specific for the respective granulate or powder. In pharmaceutical applications, this mechanical strength is also called "hardness" or crushing force. Preferably, hardness should be converted into tensile strength, being a format-independent parameter describing the mechanical strength of a compact.

However, if the relationship between the mechanical strength and the apparent density of the ribbons/flakes (the so-called the bondability) and/or the relationship between apparent density and pressure for achieving a given density (the so-called compressibility) has changed fundamentally, e.g. because of using excipients and/or active principle(s) with (completely) different compaction properties, the manufacturing of ribbons/flakes with the same apparent density and/or density distribution in general will not result in ribbons/flakes with the same mechanical strength and/or strength distribution. This may likely be the case if excipients and/or active principles are obtained from different manufacturers or when a manufacturer has changed the production process of an excipient or an active principle, or active ingredient.

In order to be able to correct for changes in the bondability of the powder intended for roller compaction, so as to make ribbons/flakes with the same overall mechanical strength, these compaction properties have to be determined repeatedly, which under daily production conditions will be associated with considerable difficulties and extra costs.

One frequently used approach are in-process-controls with which from time to time the particle size distribution (PSD) of a granulate sample is determined and recorded. However, the disadvantage associated with this is that a sample has to be withdrawn and either has to be rejected after the PSD-measurement or fed back into the product container. Under contained production conditions, this is not possible or difficult to realise, since often the granules are conveyed pneumatically and upon drawing a sample, the pneumatic equilibrium conditions will be disturbed. And although determining the PSD without breaking the containment conditions during granulate production may be realized e.g. by implementing appropriate in-line particle size measurement equipment, these measurement systems need to be demounted prior to cleaning, since in general it is not possible to clean them wet, which involves breaking the containment conditions, increasing the risk of exposing personnel to hazardous dusts.

A further disadvantage of this approach is that differences in the mechanical strength of ribbons/flakes will not always result in significantly different particle size distributions, and therefore, the particle size distribution is not a reliable parameter for ribbon/flake strength. Moreover, the particle size distribution does not only depend on the mechanical strength of the ribbons/flakes, but also on the milling system and the process parameters used and the wear of e.g. a sieve screen used for the milling process.

From the literature, an alternative method for determining the mechanical strength of ribbons/flakes is known (N. Müller, "Untersuchungen zur Prozessuberwachung und—regulierung bei der Walzenkompaktierung mittels Drehmomenterfassung an der Granuliereinheit" (Investigations as to monitoring and controlling the roller compaction process by determining the torque of the granulating unit), PhD thesis, Rheinische Friedrich-Wilhelm Universitat Bonn, Bonn 2012). In this thesis, work performed with a state of the art roller compactor (Macropactor® 100) is described. This roller compactor is equipped with a milling unit comprising a granulator (also called rotor or milling roll or milling device) which is used for milling the ribbons/flakes after their compaction between the press rolls, using a sieve screen mounted at a corresponding support. For an efficient milling process with large throughput, this granulator is usually operated in the oscillating mode, in which the direction of rotation is changed from clockwise (cw) to counter clockwise (ccw) after having travelled over a given angle and vice versa, with both the speed and the angle of rotation of the granulator being adjustable by the operator for each direction; although certain combinations of speed and angle are physically not possible, these limitations are irrelevant in practice.

In this thesis, the torque of the electrical drive of the motor unit connected to, and driving, the granulator (specifically a milling roll) is calculated by measuring and analyzing its power consumption. This power consumption method is associated with a number of drawbacks, though. Firstly, measuring the power consumption properly may be complicated, especially for alternate current (AC) drives of which the speed is varied with a frequency converter. Secondly, a change in the direction of rotation is always accompanied by a change in the power consumption, and thus, the magnitude of these power consumption signals is not solely related to the power consumption required for the actual breaking of the ribbons/flakes. Therefore, the corresponding electrical signals have to be corrected for these 'change of direction signals'.

It could be shown in this thesis that the thus corrected power consumption measurement data in principle correlate with the mechanical strength of the ribbons/flakes. However, the sensitivity of the power consumption signals related to ribbon strength is rather low compared to the baseline power consumption signals without milling. In addition, it is reported that quite a number of other, non-ribbon-strength-related manufacturing parameters (e.g. the filling degree of the milling unit and the size of the gap between the milling roll and the sieve screen) also have an influence on the corrected power consumption signals. Unfortunately, the magnitude of such 'other milling parameters signals' is in the same order of magnitude as the 'ribbon strength signals', especially when making ribbons with a strength which is minimally required for making granules with an appropriate flowability, like e.g. required for making tablets with a rotary tablet press or capsules with a capsule filling device. Especially when the original powder blend has poor bondability properties, making ribbons/flakes with a small tensile strength is a requirement in order to obtain a dry granulate with hopefully still large enough bondability properties. This is especially important when tablets have to be made from the dry granulate. The minimally required ribbon strength for making granules with sufficient flowability, whilst preserving a possibly large bondability of the dry granulate amounts to typically at least about 0.3 to 0.5 MPa. Using the power consumption measurement method, this corresponds to a low 'ribbon strength' to 'other parameter' signal ratio. This low signal ratio seems to be an inherent problem associated with the power consumption measurement method.

In addition, the fact that, as described above, the magnitude of the power consumption signals at the onset of the change in rotation direction could not be used, represents a serious draw back, since it has been observed that especially at the beginning of this change in rotation direction of the milling roll, a considerable part of the milling work is performed.

Therefore, there is still a high need for a method and a device, or system, with which the mechanical strength of ribbons/flakes can be determined reliably, and preferably non-invasively, during the dry granulate manufacturing process, especially mechanical strengths in the range of ribbon strengths which are of interest for making dry granulates from which tablets are intended to be made subsequently. In case of poor bondability properties of the powder blend intended for roller compaction, the desired ribbon strengths range from about 0.3 to about 0.5 MPa, and in case the bondability of the powder blend is good enough, ribbons/flakes should preferably be made with tensile strengths ranging from about 0.5 to about 2.0 MPa, especially from about 0.5 to about 1.2 MPa. At the latter strength range, usually ribbons can be milled into granules with flow properties, which are good enough for making tablets with rotary tablet presses with weight fluctuations within legally required ranges. However, in some cases also ribbon strengths above 1.2 MPa may be required, e.g. for achieving the target specifications of tablets or capsules, like e.g. tablet thickness and/or tablet tensile strength or bulk density, respectively.

Hence it is an object of the present invention to provide alternative device(s) and/or method(s) for determining and monitoring the mechanical strength, preferably the tensile strength, of ribbons/flakes during a dry granulate manufacturing process; and, if necessary or considered expedient, to control or regulate said manufacturing process manually or automatically.

This object is solved by the subject matter of the present invention as set forth in the claims.

SUMMARY OF THE INVENTION

In a first aspect, the invention provides a continuous dry granulation method comprising the steps of (a1) compacting a powder between counter-rotating press rolls in a roller compaction unit, such as to obtain a compacted material in the form of ribbons and/or flakes; and (b1) milling the ribbons and/or flakes obtained in step (a1) with a milling unit comprising a rotating and/or oscillating milling roll or other milling device, and a screen such as to obtain granules, wherein the milling roll or milling device is driven by a motor unit having an electrical drive; and (c1) monitoring step (a1), using signals obtained from a sound sensor and/or a structure-borne sound sensor located at or near the milling unit; wherein steps (a1) and (b1) are conducted concurrently, and wherein step (c1) is conducted concurrently or intermittently with steps (a1) and (b1).

In a second aspect, the invention provides a continuous dry granulation method comprising the steps of (a2) compacting a powder between counter-rotating press rolls in a roller compaction unit, such as to obtain a compacted material in the form of ribbons and/or flakes; and (b2) milling the ribbons and/or flakes obtained in step (a2) with a milling unit comprising a rotating and/or oscillating milling roll or other milling device, and a screen such as to obtain granules, wherein the milling roll or milling device is driven by a motor unit having an electrical drive; and (c2) determining the at-pressure volume flow and the mass flow of the compacted material obtained in step (a2) and/or (b2), respectively; and (d2) non-invasively determining the tensile strength of the compacted material using a signal obtained from at least one sensor system located outside the electrical drive of the motor unit and not generated by the electrical drive; wherein steps (a2) and (b2) are conducted concurrently, and wherein steps (c2) and (d2) are conducted concurrently or intermittently with steps (a2) and (b2). The sensor system located outside the electrical drive of the motor unit may, for instance, be a sound sensor and/or structure-borne sound sensor located at or near the milling unit as described above for the method of the first aspect; or a force sensor and/or a strain sensor.

Optionally, the dry granulation methods may further comprise a step of determining the apparent at-pressure-density of the compacted material concurrently with the compacting, milling and/or monitoring steps of the above dry granulation processes; for instance, as a step (d1) concurrently with steps (a1), (b1) and (c1) of the method according to the first aspect; or as a step (e2) concurrently with steps (a2), (b2), (c2) and/or (d2) of the method according to the second aspect.

The roll force (i.e. the force which is exerted onto the powder between the rolls) of the counter-rotating press rolls and/or the gap width, (also called gap size), may be adjusted whilst conducting the dry granulation methods according to the first and second aspect; for instance whilst conducting steps (a2) to (d2), in response to the signals obtained in step (d2) of the inventive dry granulation method, optionally in response to signals which are corrected for the mass flow of the compacted material, as for instance obtained in step (c2) of the method according to the second aspect.

The invention is based on the surprising discovery that the compaction of powders between the counter-rotating press rolls of a roller compaction unit may be monitored; and in particular the mechanical strength of ribbons/flakes (preferably the tensile strength, expressed in MPa or $N/mm^2$), may be determined non-invasively during a roller compaction process by measuring and analyzing parameters such as:

a) the forces applied to
  the screen of the milling unit, the support used for mounting the screen (also referred to as the screen support), the mounting and/or suspension attachments of the screen support, the walls, used for assembling the mounting devices and/or the suspension supports of the screen support, and/or
  the milling roll, or other milling device, and/or the shaft on which the milling roll or milling device is mounted, using a force sensor and/or a strain sensor;
  and/or
b) the structure-borne sound with a vibration and/or acceleration transducer, which is attached to, or positioned at or near,
  the screen support of the milling unit, the mounting and/or suspension attachments of the screen support, and/or
  other machine parts in contact with the screen support and/or its mounting and/or suspension attachments, and/or
c) the airborne sound, usually with a sound sensor (e.g. a microphone) and/or a pressure transducer which is attached or positioned at an appropriate distance to the screen and/or the screen support and/or the milling roll, or other milling device, of the milling unit, be it within the process housing, or below the outlet of the milling unit or at the outside of the process housing, whilst the ribbons/flakes are milled in the milling unit. In other words, the dry granulation process may be monitored—in particular, monitored non-invasively during the roller compaction process with respect to the tensile strength of the ribbons/flakes—using sensors located, for instance, at or near the milling unit of a dry granulation system.

For this purpose, the sensor system employed in the dry granulation methods according to the first and second aspect may comprise a sensor selected from force sensors, strain sensors, vibration sensors, acceleration sensors, pressure sensors and sound sensors.

Signals obtained from at least two sensor systems may also be used in the dry granulation methods according to the first and second aspect; for instance, in step (d2) of the method according to the second aspect for non-invasively determining the tensile strength.

In a third aspect, the invention provides a dry granulation system (sometimes shortly referred to as the machine) comprising (A1) a roller compaction unit, comprising at least two counter-rotating press rolls, the press rolls being arranged for compacting powder into ribbons and/or flakes, (B1) at least one milling unit for milling the ribbons and/or flakes into granules, comprising a rotating and/or oscillating milling roll or other milling device for breaking and reducing the size of the ribbons and/or flakes, each milling roll or milling device having a shaft, wherein the milling unit is equipped with at least one screen and an outlet, and wherein the milling roll or milling device is driven by a motor unit having an electrical drive; and (C1) a sound sensor and/or structure-borne sound sensor located at or near the milling unit, said sensor being capable of measuring and transmitting a signal which can be used to monitor the compaction of the powder between the counter-rotating press rolls of the roller compaction unit.

In a fourth aspect, the invention provides a dry granulation system (sometimes shortly referred to as the machine) comprising (A2) a roller compaction unit, comprising at least two counter-rotating press rolls, the press rolls being arranged for compacting powder into ribbons and/or flakes, (B2) at least one milling unit for milling the ribbons and/or flakes into granules, comprising a rotating and/or oscillating milling roll or other milling device for breaking and reducing the size of the ribbons and/or flakes, each milling roll or milling device having a shaft, wherein the milling unit is equipped with at least one screen and an outlet, and wherein the milling roll or milling device is driven by a motor unit having an electrical drive; and (C2) at least one sensor system comprising at least one sensor located outside the electrical drive of the motor unit, said sensor being capable of measuring and transmitting a signal from which the tensile strength of the compacted material can be determined non-invasively. Said sensor system located outside the electrical drive of the motor unit may, for instance, be a sound sensor and/or structure-borne sound sensor located at or near the milling unit as described above for the system of the third aspect; or a force sensor and/or a strain sensor.

The sensor of the inventive dry granulation systems according to the third and the fourth aspect of the invention may be selected from force sensors, strain sensors, vibration sensors, acceleration sensors, pressure sensors and sound sensors.

The dry granulation systems of both the third and the fourth aspect of the invention may comprise a process housing having a frame, a front wall, a rear wall, one or more side walls (includes the top and bottom walls), and optionally devices for sampling ribbons/flakes and/or granules, and fixation parts attached to this housing for mounting it to the frame, e.g. a frame of square-type tubes to which all components of the system are attached directly or indirectly. The milling unit may further comprise a screen support (comprising the parts required for assembling and fixing the screen), a mounting and/or suspension attachment for mounting said screen support and a shaft on which the milling roll or other milling devices for reducing the size of ribbons/flakes are mounted. The sensor may be attached to, or positioned at or near, the front wall, the rear wall and/or the side walls of the process housing; the fixation parts attached to the process housing; the screen, the screen support, the mounting and/or suspension attachment(s) of the screen support; and/or the shaft of a milling roll or other milling device, and/or the housing in which said shaft is mounted.

In one embodiment, the sensor is a force sensor and/or a strain sensor, which may be attached to, or positioned at or near, the screen, the screen support, the mounting and/or suspension attachment(s) of the screen support; the back side or the front side of the rear wall of the process housing; and/or the shaft of a milling roll or other milling device, and/or the housing in which said shaft is mounted. In particular, the force and/or strain sensor may be attached to, or positioned at or near, the mounting and/or suspension attachment(s) of the screen support; and/or at the front side or the back side of the rear wall of the process housing, the latter at a distance of no more than 15 cm, or no more than 10 cm, or no more than 5 cm; and preferably of no more than 2 cm, from the mounting position of the mounting and/or suspension attachment of the screen support. For the dry granulation system according to the third aspect of the invention, said force sensors and/or strain sensors may be used in addition to the sound sensors and/or structure-borne sound sensors.

In a further embodiment, the sensor is a vibration sensor and/or acceleration sensor, which may optionally be attached to, or positioned at or near, the screen, the screen support, the mounting and/or suspension attachment(s) of the screen support; the shaft of a milling roll or other milling device, the housing in which said shaft is mounted; the front wall, the rear wall, or the side walls (includes the top and bottom walls) of the process housing; and/or at fixation part(s) attached to the process housing. In particular, the vibration and/or acceleration sensor may be attached to, or positioned at or near, the mounting and/or suspension attachment(s) of the screen support or to the screen support. Preferably, the vibration and/or acceleration sensor is attached to the mounting and/or suspension attachments of the screen support. This is advantageous since attaching them to the screen support may lead to damages of the vibration and/or acceleration sensor system more easily, because of disrupting the cables (which are part of this sensor system) upon demounting the screen support, e.g. when cleaning the milling unit of the roller compaction device. The vibration sensor and/or acceleration sensors typically function as structure-borne sound sensors and may thus be used as the structure-borne sound sensors favoured in, or preferably used in, the dry granulation system according to the third aspect of the invention.

In a yet further embodiment, the sensor is a sound sensor and/or a pressure sensor, which may optionally be positioned within the process housing below the screen optionally within a distance of up to about 30 cm, or up to about 13 cm, from the screen support; or within the process housing above the screen, optionally within a distance of up to about 150 cm, or up to about 80 cm, from the screen; or outside the process housing within or below the outlet of the milling unit within a range of about 13 to about 60 cm from the screen and preferably at as small a distance as possible within this range, but still within or below the outlet of the milling unit; and/or wherein the sensor is preferably positioned in such a way that it is capable of receiving unreflected and/or unattenuated sound pressure waves emitted by the screen, the screen support, the ribbons/flakes and/or the granules during the dry granulation process. The pressure sensors may function as sound sensors and may thus be used as the sound sensors favoured in, or preferably used in, the dry granulation system according to the third aspect of the invention.

In a further aspect, the invention provides the use of a sound sensor and/or a structure-borne sound sensor for monitoring a dry granulation process.

In a yet further aspect, the invention is directed to the use of the above described dry granulation systems of both the third and the fourth aspect, for manufacturing granules from a powder. The powder may exhibit an intra-batch or batch-to-batch variability of its compaction properties, such as compressibility and bondability, which are relevant for manufacturing granules within the quality relevant range.

In a yet further aspect, the invention provides granules obtained by the above described dry granulation method(s) of both the first and the second aspect.

In a final aspect, the invention provides a method of calibrating the sensor and/or sensor system in the dry granulation systems according to both the third and the fourth aspect of the invention, wherein the calibration is performed by milling tablets of known tensile strength, or fragments thereof (e.g. tablets cut or broken into smaller pieces such as halves, quarters, granules etc.), in the milling unit of the dry granulation system, and determining and analysing the signals obtained from the sensor and/or sensor system upon milling in order to perform a calibration and/or to establish a calibration curve.

Further objects, aspects, useful embodiments, applications, beneficial effects and advantages of the invention will become apparent on the basis of the detailed description, the examples and claims below.

DEFINITIONS

Figure 1:
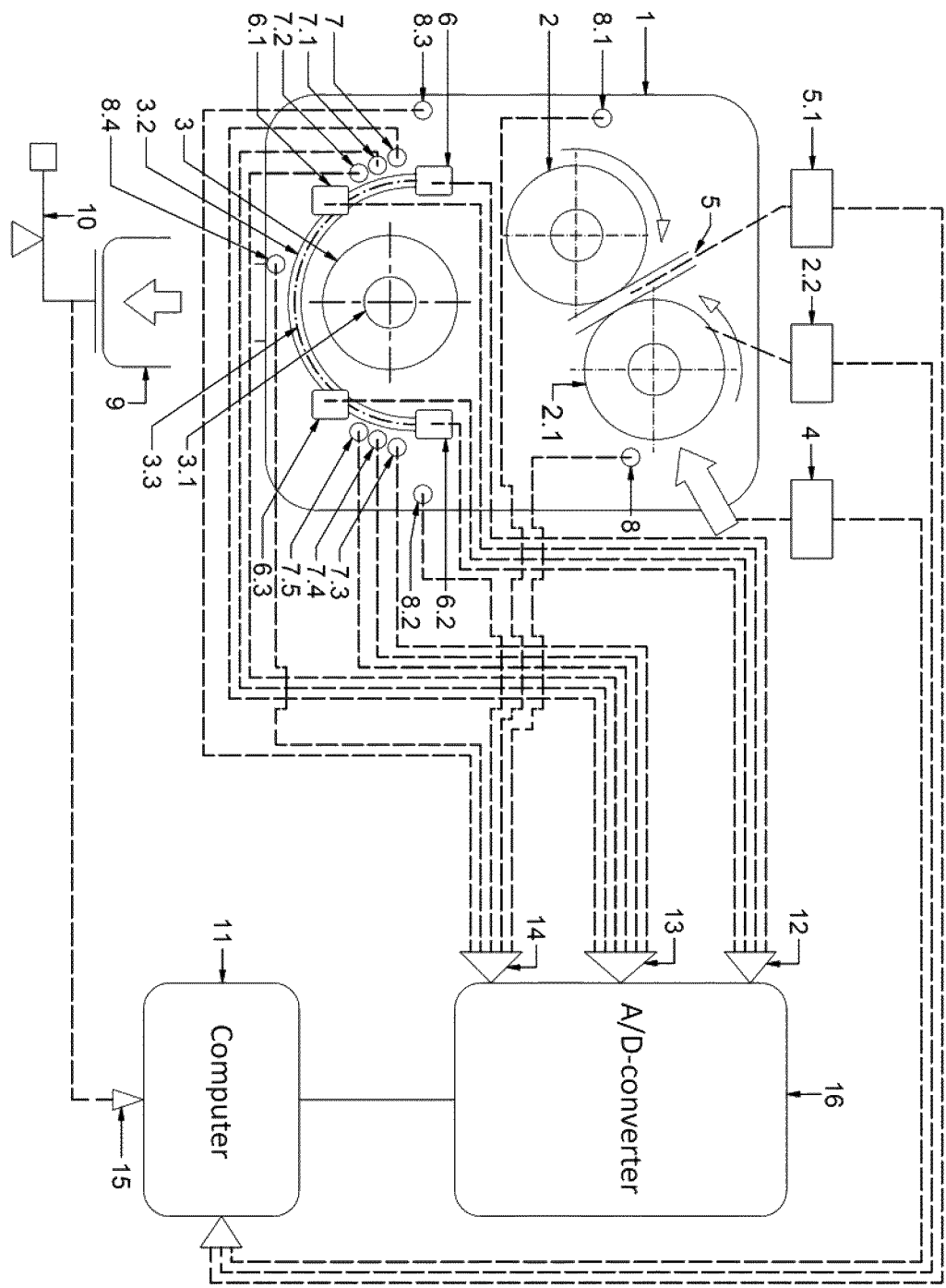
FIG. 1 shows a cross-section of the inventive dry granulation system.

All technical terms as used herein shall be understood to have the same meaning as is commonly understood by a person skilled in the relevant technical field.

The following terms or expressions as used herein should normally be interpreted as outlined in this section, unless defined otherwise by the description or unless the specific context indicates or requires otherwise:

The words 'comprise', 'comprises' and 'comprising' and similar expressions are to be construed in an open and inclusive sense, as 'including, but not limited to' in this description and in the claims.

The singular forms 'a', 'an' and 'the' should be understood as to include plural referents. In other words, all references to singular characteristics or limitations of the present disclosure shall include the corresponding plural characteristic or limitation, and vice versa. The terms 'a', 'an' and 'the' hence have the same meaning as 'at least one' or as 'one or more'. For example, reference to 'a sensor' includes a plurality of sensors, and the like.

The expressions, 'one embodiment', 'an embodiment', 'a specific embodiment' and the like mean that a particular feature, property or characteristic, or a particular group or combination of features, properties or characteristics, as referred to in combination with the respective expression, is present in at least one of the embodiments of the invention. These expressions, occurring in various places throughout this description, do not necessarily refer to the same embodiment. Moreover, the particular features, properties or characteristics may be combined in any suitable manner in one or more embodiments.

All percentages, parts and/or ratios in the context of numbers should be understood as relative to the total number of the respective items, unless otherwise specified, or indicated or required by the context. Furthermore, all percentages parts and/or ratios are intended to be by weight of the total weight; e.g. '%' should be read as 'wt.-%', unless otherwise specified, or indicated or required by the context.

'Essentially', 'about', 'approximately' (approx.), 'circa' (ca.) and the like in connection with an attribute or value include the exact attribute or the precise value, as well as any attribute or value typically considered to fall within a normal range or variability accepted in the technical field concerned.

Any reference signs in the claims should not be construed as a limitation to the embodiments represented in any of the drawings.

As used herein, a 'granule' or 'granulate' refers to an agglomerated particle which has been prepared from a plurality of smaller, primary particles. Agglomeration, or granulation, for the purpose of preparing a granule, may involve the use of a dry, wet or melt granulation technique. For the purpose of the present invention, though, the term 'dry granulation' refers specifically to granulation techniques comprising at least a compaction step, or further specifically to techniques comprising a roller compaction step (or in other words, compaction between rotating press rolls) and a subsequent milling step to mill the compacted material into granules. This means that in 'dry granulation' processes as of the present invention, typically, no liquids are employed and/or no drying steps required. The term 'granule' itself does not necessarily imply a specific shape, since the final shape of the granule(s) will be controlled by the specific method of preparation.

The terms 'ribbons' and 'flakes', as used herein, both refer to the compacted material which exits the gap between the press roll(s) of the roller compaction device at the side opposite to where the powder is drawn in. After having left the roll gap, this compacted material may take various shapes, depending on e.g. the compactability of the powder, ranging between coherent, usually curved and comparatively even sheets (the 'ribbons') and/or broken pieces, or fragments, thereof (the 'flakes') or even loosely packed powder (material that is not or poorly compactable). Since commonly both shapes, ribbons and flakes, occur in parallel to some degree, the term 'ribbon' or 'ribbons' is intended to include both, ribbons and/or flakes. In other words, even if used alone, the term 'ribbon' is not limited to a specific shape of the compacted material but should be understood as 'ribbons/flakes' or as 'ribbons and/or flakes', unless where explicitly specified otherwise.

The term 'compactability' refers to the ability of a material to be processed into a compact in terms of mechanical strength. The lower the compaction pressure required for obtaining a given mechanical strength of the compact, the better the compactability of the material.

Similarly, the term 'compressibility' refers to the ability of a material to be processed into a compact in terms of density. The lower the compaction pressure required for obtaining a given density, or solid fraction, of the compact, the better the compressibility of the material.

The term 'bondability' refers to the ability of a compacted material to achieve a given mechanical strength at a given apparent density, or solid fraction. The larger the mechanical strength of a compact at a given apparent density, or solid fraction, the better the bondability.

The term 'tensile strength' refers to the ability of a shaped material to withstand a mechanical force which above a threshold, would break, elongate, destroy or disintegrate the shaped body of material. The tensile strength corresponds to the maximum stress that a material can withstand without breaking, and is a property which is practically independent of the dimensions of the shaped material. And therefore, tensile strength is a suitable parameter for defining the mechanical strength of materials, including tablets and ribbons/flakes.

The tensile strength can be determined in various ways, e.g. by performing a tensile test and recording stress versus strain curves, the highest point of the stress-strain curve being the tensile strength. In the pharmaceutical field, the mechanical strength of a tablet usually is determined from the force which is required for crushing it between two plates. From the dimensions of the tablet and its crushing force, the tensile strength can be calculated. For determining the tensile strength of irregularly shaped powder compacts, like e.g. pieces of ribbons and flakes, such compression methods cannot be used, but by measuring the force(s) required for milling holes at various positions in such compacts and comparing these milling forces with the ones obtained from tablets with known tensile strength and made from the same powder blend, the tensile strength or more precisely, the tensile strength distribution of ribbons/flakes can be determined, too. Tensile strength of ribbons can also be determined by measuring the apparent density or density distribution and comparing these densities with the density of tablets with known tensile strength and made from the same powder blend.

The term 'at-pressure' in the context of parameters such as volume flow, mass flow or density refers to the respective parameter as is present or determined whilst a force is being applied to the powder still being between the rolls. Further, the term 'density' refers to the apparent density (and likewise the term 'at-pressure density' to the apparent at-pressure density), unless explicitly specified otherwise. It should further be understood that the term 'at-pressure density' refers to the overall apparent at-pressure density, i.e. as if the density is the same at any position across the ribbon, thus ignoring that in reality ribbons generally have a density distribution.

The term 'solid fraction' refers to the apparent density of a compact divided by the powder particle density, being a number between zero and one.

The term 'powder particle density' refers to the density of a material or blend without any pores and is also called 'pore free density'.

The term 'gap width', also called gap size, refers to the minimum distance between the press rolls of a roller compaction device. This gap width can be set and adjusted by the operator. Depending on the prevailing compaction conditions and/or the compaction properties of the powder to be compacted, the gap width may vary throughout the process, causing minor gap fluctuations; e.g. the rolls may be pushed apart because of irregularities in the conveyment of the powder into the compaction area between the rolls. Usually, gap fluctuations smaller than 0.2 mm have a neglectable influence on the ribbon properties.

The term 'effective gap width' refers to the gap width in case of non-smooth press rolls, e.g. rolls with regular indentations, or grooves. The effective gap width includes the minimum distance between the press rolls (determined as if the roll surface were smooth), plus an additional gap width which is calculated from the volume of the indentations on the press roll surface and the press roll's width and diameter.

The term 'granulator' refers to the device, typically a rotating and/or oscillating device (e.g. rotating and/or oscillating milling roll), comprised in the milling unit of a roller compaction device which is responsible for breaking the ribbons and/or flakes, and for reducing their size. In case of rolls or roll-like devices, these are sometimes also referred to as 'rotors' or 'granulating rolls' or 'milling rolls'.

As used herein, the terms 'volume flow' and 'mass flow' refer to the volume and the mass of the compacted material flowing between, or passing, the press rolls per time unit, respectively. The volume flow is determined from the roll speed (revolutions per minute), the dimensions of the press rolls (roll width, roll circumference), the volume of the indentations of the press roll surface, if any, and the smallest distance between the press rolls during roller compaction (i.e. the gap width), whereas the mass flow is obtained by measuring—as a surrogate value—the amount, or mass, of granules leaving the milling system per unit of time (as measured e.g. by a computer-connected scale at the outlet of the milling unit). Although there is a small time lapse between the compaction process and the milling process, both parameters may be used to describe the properties of the same ribbons, provided that so-called steady state conditions are prevailing and only minimal granulate losses (e.g. granulate not falling onto the scale) occur.

'Front' as well as all similar terms designating a position, orientation or direction, such as 'left', 'right', 'rear', 'back', 'top', 'bottom', 'up', 'down' and the like, should be understood with reference to the orientation of the dry compaction device, or dry granulation system or machine, or its components under normal operational conditions. 'Lateral', or 'laterally', means away from the middle, centre, or centre axis of a device or device component.

The term 'distance', e.g. between a sensor and a structural component of the dry granulation system, refers to the shortest distance between the respective parts in their normal operational position and orientation within the dry granulation system.

The terms 'sensor' and 'transducer' are used synonymously herein, unless where specified otherwise, and refer to means which are capable of measuring a parameter (for instance, a force, vibration or sound) and transmitting the related signal(s) to a data analysis unit, e.g. an electric signal which can be received, read, stored and analysed by a computer or a similar data analysis unit. In that regard, it should be understood that a wording such as 'a signal obtained from at least one sensor system' strictly speaking refers to the signal as transmitted to the computer, and thus not necessarily refers to the actual measured parameter, or measurand, such as a force which triggered the respective signal.

The term 'sensor system' refers to a system comprising one or more sensors which are typically intended to measure one or more given parameters, e.g. a specific sound emitted in the vicinity of the screen during milling a compacted material, such as a ribbon, into granules. Further, the term 'sensor system' describes the sensor in a broader sense, including not only the actual sensing element but also the associated structures, such as attached electrical connections, mounting attachments, casings, signal conditioners and the like. According to the dry granulation system and method of the invention, more than one sensor system may be mounted and used; e.g. one sensor system for measuring a sound signal emitted in the vicinity of the screen during milling, and another sensor system for measuring the vibrations of the mounting attachment of a screen support, and/or one more sensor system for measuring strain of machine parts, vibrations and strain caused by forces acting on the screen during the milling process. Further, the sensor system may comprise one or more sensor types; e.g. a specific sound signal may be measured using two or more microphones of the same type or of different types, such as two electrical condensor microphones, or one electrical condensor microphone combined with one moving coil microphone.

For reasons of simplicity, the terms 'sound', 'sound signal' and in particular 'sound sensor' as used herein refer to an airborne sound, airborne sound signal and airborne sound sensor, respectively, unless where it is explicitly stated otherwise. Where referring to structure-borne sounds, sound signals and sound sensors, on the other, these are explicitly denominated as 'structure-borne sound', 'structure-borne sound signal' and 'structure-borne sound sensor', respectively. Examples of airborne sound sensors include microphones or pressure sensors exhibiting appropriate resolution and sensitivity to measure sounds; whereas examples of structure-borne sound sensors include vibration and/or acceleration sensors.

DETAILED DESCRIPTION OF THE INVENTION

In a first aspect, the invention provides a continuous dry granulation method comprising the steps of (a1) compacting a powder between counter-rotating press rolls in a roller compaction unit, such as to obtain a compacted material in the form of ribbons and/or flakes; and (b1) milling the ribbons and/or flakes obtained in step (a) with a milling unit comprising a rotating and/or oscillating milling roll or other milling device, and a screen such as to obtain granules, wherein the milling roll or milling device is driven by a motor unit having an electrical drive; and (c1) monitoring step (a1) using signals obtained from a sound sensor and/or a structure-borne sound sensor located at or near the milling unit;

wherein steps (a1) and (b1) are conducted concurrently, and wherein step (c1) is conducted concurrently or intermittently with steps (a1) and (b1).

In other words, using the signals obtained from said sound sensor and/or structure-borne sound sensor, at least the compaction step of the described continuous roller compaction process is monitored whilst the process is running. Optionally, steps (a1) and (b1) of the continuous dry granulation process are monitored in step (c1) using signals obtained from the sound sensor and/or the structure-borne sound sensor located at or near the milling unit.

In one embodiment, step (a1) is monitored with respect to the mechanical strength of the compacted material in the form of ribbons and/or flakes, in particular the tensile strength. Preferably, the tensile strength of the compacted material is determined non-invasively using a signal obtained from the sound sensor and/or the structure-borne sound sensor.

In one of the preferred embodiments of the above method, the sound sensor and/or the structure-borne sound sensor are comprised in at least one sensor system located outside the electrical drive of the motor unit of the milling unit; and the monitoring of step (a1) comprises using a signal obtained from said sensor system; for instance, a signal derived from the airborne and/or structure-borne sounds arising from the ribbon/flakes milling process.

In a specific embodiment, the monitoring of step (a1) further comprises determining the at-pressure volume flow and the mass flow of the compacted material obtained in step (a1) and/or (b1), respectively.

In a further specific embodiment, the monitoring of step (a1) further comprises determining the at-pressure volume flow and the mass flow of the compacted material obtained in step (a1) and/or (b1), respectively; and non-invasively determining the tensile strength of the compacted material using a signal obtained from the sound sensor and/or the structure-borne sound sensor.

As used herein, the term 'non-invasively' refers to a manner of determining the tensile strength of the compacted material wherein the sensors are not in direct contact with the compacted material, i.e. they do not intrude into the ribbons/flakes; and wherein further it is not necessary to take a sample of the ribbons for off-line measurements, once the at least one sensor system has been calibrated in an appropriate way, i.e. no ribbon material has to be removed or withdrawn from the dry compaction process for testing purposes.

Determining the at-pressure volume flow and the mass flow of the compacted material is required for calculating the at-pressure density and may thus be important when the goal is not only to monitor but also to control the dry granulation process. Furthermore, the at-pressure volume flow and mass flow may be required for correcting the signals obtained from the sensor system upon determining the actual tensile strength of the ribbons. Hence, in a further embodiment, the monitoring of step (a1) further comprises determining the apparent at-pressure-density of the compacted material concurrently with steps (a1), (b1) and (c1). The at-pressure-density can be calculated from the at-pressure volume flow and the mass flow rate.

This first aspect of the invention is based on the surprising discovery that sound sensors and/or structure-borne sound sensors are very suitable sensor systems for obtaining signals from which the tensile strength may be determined. In particular, the sound emitted when the ribbons are milled in the milling unit has been found to correlate with the tensile strength of the compacted material. If positioned such as to detect and quantify the acoustic signals emitted from the milling unit and the ribbons/flakes whilst being reduced in size, sound sensors are extremely effective in generating and transmitting electrical signals from which the tensile strength may be monitored.

Thus, in one specific embodiment of the method according to the first aspect, signals obtained from at least one sound sensor located at or near the milling unit are used for the monitoring of step (a1) according to step (c1), i.e. the compaction step of the described dry granulation process. In a further specific embodiment, the monitoring of step (a1) comprises using a signal obtained from a sound sensor and a structure-borne sound sensor located at or near the milling unit.

According to this first aspect, a sound sensor and/or structure-borne sound sensor is used during roller compaction for obtaining signals relating to the tensile strength of the compacted material. In this manner, the dry granulation process may be easily monitored: as long as no changes in the tensile strength occur during the batch manufacturing process, the sound pressure level at a given position of the sensor remains essentially the same, or remains within a specified range, and the signal obtained from the corresponding sound sensor and/or structure-borne sound sensor will also be within a specified range. This allows the monitoring and documentation of a batch manufacturing process, leading to a granulate whose quality—due to being made from ribbons within a specified tensile strength range—will also be within the specified and thus expected range.

Optionally, the dry granulation process may also be controlled, or regulated, on the basis of the signals from the sound sensor and/or structure-borne sound sensor, i.e. by adjusting a process parameter such as the roll force, when the tensile strength, as determined from the sound signals or structure-borne sound signals (optionally taking the at-pressure volume and/or mass flow rate into consideration as a correction factor, as described above), deviates from a specified range. In this manner, a sound sensor and/or structure-borne sound sensor may be used to ensure that the granulate is produced to have a consistent quality, because of being made from ribbons with the appropriate tensile strength range, even when the powder substrate shows some degree of variability, which normally, i.e. in an uncontrolled dry granulation process, may lead to changes in tensile strength during the course of manufacturing a batch.

Hence, in one embodiment of the above dry granulation method, the counter-rotating press rolls are operated at a roll speed, a gap width, and a roll force which is exerted onto the powder between the rolls, and the roll force and/or the gap width are adjusted whilst conducting steps (a1) to (c1) in response to the signals obtained in step (c1). In a further embodiment of the above dry granulation method, the roll force and/or the gap width are adjusted whilst conducting steps (a1) to (c1) in response to the signals obtained in step (c1) together with the at-pressure volume flow and the mass flow of the compacted material and/or together with the at-pressure density of the compacted material.

In a specific embodiment, the roll force and/or the gap width are adjusted in response to the signals obtained in step (c1) such as to obtain and/or maintain a predetermined, product-specific target range for the tensile strength of the compacted material. For instance, where the signals indicate a tensile strength below this target range, the roll force is increased and/or the gap width is decreased in response to the signals; or where the signals indicate a tensile strength above this target range, the roll force is decreased and/or the gap width is increased in response to the signals.

In one of the preferred embodiments, a change in roll force is performed, whilst the gap (i.e. the minimum distance between the press rolls), or more specifically the gap width is kept as constant as possible.

In one embodiment, the sound sensor is a microphone and/or a pressure sensor; in particular, a pressure sensor exhibiting appropriate resolution and sensitivity to measure sounds, or in other words a pressure sensor which functions as a sound sensor. Alternatively, or in addition thereto, structure-borne sounds may be measured by vibration sensors and/or acceleration sensors; or in other words, vibration sensors and/or acceleration sensors typically function as structure-borne sound sensors according to method and system of the invention. Further details will be provided below for the respective dry granulation system of the invention.

Optionally, signals from further sensors, i.e. sensors in addition to the sound sensor and/or the structure-borne sound sensor located at or near the milling unit, may be used in step (c1) for the monitoring of step (a1). In other words, the monitoring of step (a1) may be supplemented by, or combined with, signals from further sensors; for instance, force sensors and/or strain sensors. In one embodiment, the monitoring of step (a1) further comprises using a signal obtained from a force sensor and/or strain sensor located outside the electrical drive of the motor unit and not generated by the electrical drive of said motor unit.

In one embodiment of the inventive method, signals obtained from at least two sensor systems are used for non-invasively determining the tensile strength. In one of the preferred embodiments, the at least two sensor systems include a sensor system comprising a sound sensor and a sensor system comprising a vibration sensor and/or acceleration sensor. The vibration sensor and/or acceleration sensor typically functions as a structure-borne sound sensor. Further optionally, a pressure sensor may function as the sound sensor. In further preferred embodiments, the at least two sensor systems include a sensor system comprising a sound sensor in the form of a microphone located at or near the milling unit, and a sensor system comprising a vibration sensor and/or acceleration sensor functioning as a structure-borne sound sensor.

In a second aspect, the invention provides a continuous dry granulation method comprising the steps of (a2) compacting a powder between counter-rotating press rolls in a roller compaction unit, such as to obtain a compacted material in the form of ribbons and/or flakes; and (b2) milling the ribbons and/or flakes obtained in step (a2) with a milling unit comprising a rotating and/or oscillating milling roll or other milling device, and a screen such as to obtain granules, wherein the milling roll or milling device is driven by a motor unit having an electrical drive; and (c2) determining the at-pressure volume flow and the mass flow of the compacted material obtained in step (a2) and/or (b2), respectively; and (d2) non-invasively determining the tensile strength of the compacted material using a signal obtained from at least one sensor system located outside the electrical drive of the motor unit and not generated by the electrical drive;

wherein steps (a2) and (b2) are conducted concurrently, and wherein steps (c2) and (d2) are conducted concurrently or intermittently with steps (a2) and (b2).

In one embodiment, the at least one sensor and/or sensor system located outside the electrical drive of the motor unit is located at or near the milling unit. For instance, in a specific embodiment, the sensor system located outside the electrical drive of the motor unit may be a sound sensor and/or structure-borne sound sensor located at or near the milling unit as described above for the method of the first aspect; or a force sensor and/or a strain sensor.

The invention is based on the unexpected discovery that the step of compacting powders between the counter-rotating press rolls of a roller compaction unit may be monitored; and in particular the mechanical strength of a compacted material e.g. as obtained from roller compaction, in particular the tensile strength, which is preferably expressed in MPa or $N/mm^2$, can be determined non-invasively by measuring, during the milling process of the compacted material, parameters such as forces, structure-borne and/or airborne sounds arising from the ribbon/flakes milling process, or more specifically their related signals as obtained from an external sensor system, i.e. a sensor system located outside the electrical drive of the motor unit of the milling roll, or other milling device, sometimes also referred to as the milling motor unit, and signals not generated by the electrical drive of the motor unit. The signals obtained from the external sensor system, like force, strain, vibration, acceleration and sound signals, may be transmitted to a data acquisition system and analysed correspondingly.

According to the present invention, the continuous dry granulation methods based on roller compaction may be monitored and optionally even controlled by determining the at-pressure density and evaluating the signals from the external sensor system which are related to the ribbon strength.

For actually controlling the dry granulation method according to the second aspect of the invention, it is important that step (c2) is performed, i.e. that the at-pressure volume flow and the mass flow of the compacted material are determined, as these parameters are required for calculating the at-pressure density. Furthermore, the at-pressure volume flow and mass flow may be required for correcting the signals obtained from the sensor system upon calculating the actual tensile strength of the ribbons. In addition, the at pressure density is determined in order to prevent compaction at too high roll forces since this would result in ribbons/flakes which may have the proper mechanical strength but with such a large density that a granulate from such ribbons/flakes cannot be compacted to tablets with an appropriate tensile strength.

With regard to the at-pressure density, it is to be understood that most compacted materials exhibit elastic deformation of the ribbons upon exiting the press rolls; i.e. they expand again to a certain degree when the compaction pressure is reduced or removed. Therefore, the at-pressure density is typically larger than the density after compaction (when no pressure is applied anymore), sometimes even considerably larger. However, there exists a product- or at least batch-specific, though unique relation between the at-pressure density and the density after compaction, at least in the range of ribbon densities relevant for manufacturing dry granulates from which tablets will be made; i.e. commonly from about 0.5 to about 2.0 MPa, and preferably from about 0.5 to about 1.2 MPa, although also ribbon strengths larger than 2.0 MPa may be required, especially in case of good bondability of the powder blend, in order to achieve the target values of e.g. tablets with respect to e.g. tablet thickness and/or tablet tensile strength. Therefore, the at-pressure density may be used instead of the apparent density of the material after compaction, and together with the actual tensile strength values of the ribbons/flakes, which are calculated by correcting the signals, obtained from the signals obtained from at least one sensor system as described herein, for the at-pressure volume and mass flow rate, these measurands are used for controlling the dry granulation process. Preferably, the tensile strength is expressed in MPa or $N/mm^2$.

At least one sensor system located outside the milling motor unit's electrical drive is provided in order to measure a parameter, such as strain or force, vibration, acceleration, or sound, which is related to the ribbon strength, and to transmit and analyse the signals from which the ribbon strength may be calculated, provided that the signal is not generated by the electrical drive of the milling motor unit itself. Examples of useful parameters include forces acting on the screen and/or the milling roll or other milling device, and structure-borne and/or airborne sounds. In response to the force, the vibration or acceleration, or sound, the sensor system generates and transmits an electrical signal which may be used for calculating the tensile strength, if necessary corrected for changes, if any, of the at-pressure volume and/or the mass flow rate.

Advantageously, once the sensor systems have been calibrated appropriately, this simultaneous determination of ribbon tensile strength and ribbon at-pressure density according to the present invention can be performed in-line (i.e. during the ongoing compaction process), thereby obviating during production the need for the laborious prior art off-line establishment of the relationship between tensile strength and density of compacts formed from powders using roller compaction. This represents a major benefit in that the inventive in-line ribbon strength measurement method enables the precise monitoring and control of continuous dry granulation processes and, in consequence, the production of dry granulates of consistently good quality without any time-consuming and costly preliminary investigations.

The inventive approach of using sensors and/or sensor systems located outside the milling motor unit's electrical drive (for instance, located at or near the milling unit), and non-invasively determining the tensile strength of the compacted material using a signal obtained from said sensor and/or sensor system which is not generated by the electrical drive of the motor unit, clearly differs from the 'power consumption method' taught in the above described thesis of N. Müller. As mentioned, this thesis describes attempts to determine the tensile strength of roller-compacted materials by measuring and analyzing the power consumption of the electrical drive of the motor unit driving the milling roll; however, the results were found unsatisfactory (among other reasons, because the magnitude of the power consumption signals is not solely related to the power consumption required for the actual breaking of the ribbons/flakes).

Furthermore, this simultaneous determination of the ribbon tensile strength and ribbon at-pressure density according to the present invention is robust and more cost-effective in comparison with state of the art methods using near infrared (NIR) or terahertz based measurement systems (such as the system described in US 2015/0323451 A1), even if these methods can be used for in-line measurement of the ribbon density or density distribution. This also holds in comparison to other methods wherein the overall ribbon density is determined off-line using a scale and laser systems for determining weight and volume of a piece of a ribbon, respectively. Additionally, although both intra batch and batch to batch differences regarding the compressibility can be corrected for with any ribbon density measurement system, e.g. by adapting the roll force, these measurement methods definitely do not measure the tensile strength of the ribbons but only the density, which is a serious draw-back, especially because of batch to batch variations, since it may lead to defective, out-of-specification products.

It should be understood that whilst the systems and methods of the invention are predominantly aimed at monitoring the powder compaction step by determining the tensile strength of ribbons formed by roller compaction, the same measurement principles as described herein may also be applied in the determination of other compacts, such as tablets or fragments thereof (e.g. tablets cut or broken in a cutting mill into smaller pieces such as halves, quarters, granules etc.). This aspect is extremely valuable, since it provides a rapid yet reliable method for the 'in process' calibration of the sensor and/or sensor system of the dry granulation system, as will be detailed further below.

Compaction parameters like roll force and gap width, preferably the roll force, may simply be adapted, or adjusted, during the manufacturing process—preferably automatically (e.g. computer-operated)—in case the determined tensile strength of the ribbons differs from the target value or range for a specific product, with the effect that ribbons with a predefined, preferred, or required, tensile strength are manufactured. This beneficial approach, sometimes referred to as 'built-in quality', represents a valuable quality assurance and management tool for the production of dry granulates with roller compaction devices, and advantageously reduces the number of defective batches; for instance, batches with a mechanical strength too low to enable storage and transportation of the granules obtained from the dry granulation process, and/or too high to allow for their compaction into tablets.

A further advantage of the inventive method and the respective inventive dry granulation systems (as described in further detail below) is that most of the required measurement sensors, or transducers, can be mounted in such a way that wet cleaning with subsequent drying is possible without the need for demounting these transducers. Therefore, containment conditions can be preserved both of the dry granulation equipment and of its involved isolators. In fact, by using the inventive dry granulation method and system, it is possible for the first time to perform measurements for real in-process control without any influence on the containment of the dry granulation system, or the roller compaction machine, and its related isolators.

A yet further advantage of the inventive methods to perform dry granulation whilst measuring ribbon tensile strength and ribbon density in-line simultaneously, is that it also enables the precise monitoring and documentation of the compaction and densification properties of the dry granulation products. Although any relevant change in these product properties will (automatically) result in a change of the roller compaction parameters, both under manual and computer control, the change in the compaction and compression properties can be used for documenting changes e.g. due to a change in the manufacturer or supplier of an excipient or an active principle. In other words, since the compaction parameters such as the roll force will be automatically adapted in case of intra-batch and batch-to-batch product related differences, these adaptions may be used to identify and document said differences in a dry granulation product. In this manner, for instance quality differences between excipients and/or active principles from different suppliers or other phenomena, like e.g. segregation within a given batch, as far as these result in a change in compaction and densification properties, may be identified.

Naturally, the target values or ranges (i.e. the preferred or required tensile strength) aimed at during the dry granulation method will commonly vary for different (end) products; e.g. the preferred tensile strength range of ribbons/flakes being milled to granules, which will be compressed into tablets, may differ from the tensile strength of ribbons/flakes milled to granules, which will be filled into e.g. sachets, stick packs or capsules. Hence, it is hardly possible to set specifications in respect of required tensile strengths or acceptable tensile strength ranges, which are generally valid for, or applicable to, all products, even though there are some broader ranges which are to some degree generally applicable. In one embodiment, for instance, the lower limit for the tensile strength of ribbons, the granules of which are intended to be compressed into tablets is about 0.3 to about 0.5 MPa (in case of poor bondability properties of the powder to be roller compacted), preferably from about 0.5 to about 2.0 MPa, and most preferably from about 0.5 to about 1.2 MPa (in case of good bondability properties), although in some cases also ribbon strengths larger than 2.0 MPa may be required, e.g. for achieving the target specifications of tablets regarding e.g. tablet thickness and/or tensile strength.

When adapting the compaction parameters, preferably a change in roll force is performed, whilst the gap (i.e. the minimum distance between the press rolls), or more specifically the gap width is kept as constant as possible. This is required for GMP processes, in which both the set up of the roller compaction device (e.g. gap sealing, press roll type, milling roll type and screen type and aperture) is specified precisely and in which e.g. the gap has to be kept constant within a specified range, whereas process parameters like roll speed and roll force may be changed, as long as the properties of the dry granulate are within the specified range.

Alternatively, the gap width may be changed for adjusting the tensile strength of the ribbons, which may also require a change of the roll force for achieving granules with specified properties. The corresponding changes in the at-pressure volume flow and mass flow rate may have to be considered during evaluation of the signals obtained from the sensor system and upon their conversion into tensile strength values.

For products showing a relevant influence of roll speed on the tensile strength of the ribbons, the tensile strength may also be adjusted by changing the roll speed. However, this is usually not the case for powder densification with roller compaction devices. In case the roll speed is adjusted, it may be necessary to correct for the changes in at-pressure volume and mass flow rate upon calculating the tensile strength of the ribbons from the signals obtained from the sensor system(s). With respect to the roll speed, it should be understood that in roller compactors as described herein the roll speed of the counter-rotating press rolls is typically the same, or essentially the same, for both press rolls, or all press rolls. In that regard, roller compactors differ from e.g. roller mills in which the counter rotating milling rolls are deliberately operated at different roll speeds to achieve a milling action.

In one embodiment according to the second aspect of the invention, the dry granulation method further comprises a step (e2) of determining the apparent at-pressure-density of the compacted material concurrently with steps (a2), (b2), (c2) and/or (d2). As mentioned above, the at-pressure-density can be calculated from the at-pressure volume flow and the mass flow rate of the material, which is compacted.

Where more than one sensor system is employed, their respective signals may be combined in the evaluation of the mechanical strength. In one embodiment, signals obtained from at least two sensor systems are used in step (d2) of the inventive dry granulation method for non-invasively determining the tensile strength of the compacted ribbon and/or flakes. In one of the preferred embodiments, the at least two sensor systems include a system comprising a sound sensor (e.g. a sound sensor located at or near the milling unit) and a system comprising a vibration sensor and/or acceleration sensor; or a system comprising a sound sensor and a strain sensor. As has been described above for the first aspect of the invention, the vibration sensor and/or acceleration sensor typically functions as a structure-borne sound sensor; and/or the pressure sensor may function as sound sensor. In further preferred embodiments, the at least two sensor systems include a sensor system comprising a sound sensor in the form of a microphone located at or near the milling unit, and a sensor system comprising a vibration sensor and/or acceleration sensor functioning as a structure-borne sound sensor.

As mentioned before, the counter-rotating press rolls are operated at specific roller compaction parameters, namely a roll speed, a gap width and a roll force (i.e. the force which is exerted onto the powder between the rolls). Typically, these parameters may be controlled, or adjusted, by the operator, for instance at the start of a process.

Based on the present invention, they may also be adjusted during the process in response to specific events, such as when the tensile strength does not correspond to a pre-defined or pre-set target range. For instance, in one embodiment according to the second aspect of the invention, the roll force and/or the gap width are adjusted whilst conducting steps (a2) to (d2) in response to the signals obtained in step (d2) of the inventive dry granulation method. Preferably, this adjustment is achieved automatically, e.g. computer-operated, rather than manually by a human operator.

In a specific embodiment according to the second aspect of the invention, the roll force and/or the gap width are adjusted in response to the signals obtained in step (d2) such as to obtain and/or maintain a predetermined, product-specific target range for the tensile strength of the compacted material. For instance, where the signals indicate a tensile strength below this target range, the roll force is increased and/or the gap width is decreased in response to the signals; or where the signals indicate a tensile strength above this target range, the roll force is decreased and/or the gap width is increased in response to the signals.

In one of the preferred embodiments according to the second aspect of the invention, only the roll force is adjusted whilst conducting steps (a2) to (d2) in response to the signals obtained in step (d2). As mentioned above, the maximum roll force to be adjusted should of course be chosen such as prevent the compaction, or preparation, of ribbons/flakes which may have the proper mechanical strength but with such a large density that a granulate from such ribbons/flakes cannot be compacted to tablets with an appropriate tensile strength.

Typically, the signals obtained in step (d2) correlate with a specific tensile strength for a given material when operating the dry granulation system at a constant mass flow. In cases where the mass flow changes, though, this may have impact on the signals obtained via the at least one sensor system in step (d2). For instance, when increasing the mass flow, a signal such as sound signal emitted at or near the screen may increase in intensity. Therefore, if the mass flow changes, such change must be taken into consideration—and the measured signals corrected if necessary—when analysing the signals obtained in step (d2). Hence, in a specific embodiment, the roll force and/or the gap width are adjusted in response to the signals obtained in step (d2) and corrected for the mass flow as determined in step (c2), such as to obtain and/or maintain a predetermined, product-specific target range for the tensile strength of the compacted material.

In one embodiment, the at least one sensor system employed in the dry granulation methods according to both the first and second aspect of the invention, comprises one or more sensor(s) selected from force sensors, strain sensors, vibration sensors, acceleration sensors, pressure sensors and sound sensors. In specific embodiments of the methods, the vibration sensors and/or acceleration sensors function as structure-borne sound sensors. Similarly, the pressure sensors may function as sound sensors. In particular, sound sensors and/or structure-borne sound sensors, as favoured in, or preferably used in, the dry granulation method according to the first aspect of the invention, were found to be suitable for monitoring dry granulation processes; yet, further sensors may be selected and used in addition to said sound sensors and/or structure-borne sound sensors, for instance, force sensors and/or strain sensors. Examples of suitable sensors will be provided in further detail below when addressing the inventive dry granulation system.

In a third aspect, the invention provides a dry granulation system (sometimes shortly referred to as the machine) comprising (A1) a roller compaction unit, comprising at least two counter-rotating press rolls, the press rolls being arranged for compacting powder into ribbons and/or flakes, (B1) at least one milling unit for milling the ribbons and/or flakes into granules, comprising a rotating and/or oscillating milling roll or other milling device for breaking and reducing the size of the ribbons and/or flakes, each milling roll or milling device having a shaft, wherein the milling unit is equipped with at least one screen and an outlet, and wherein the milling roll or milling device is driven by a motor unit having an electrical drive; and (C1) a sound sensor and/or structure-borne sound sensor located at or near the milling unit, said sensor being capable of measuring and transmitting a signal which can be used to monitor the compaction of the powder between the counter-rotating press rolls of the roller compaction unit.

In a specific embodiment of this aspect, the sound sensor and/or the structure-borne sound sensor are comprised in at least one sensor system located outside the electrical drive of the motor unit; and monitoring the compaction of the powder between the counter-rotating press rolls comprises using a signal obtained from said sensor system.

In one embodiment of the dry granulation system, the sound sensor is a microphone and/or a pressure sensor. In a further embodiment, the structure-borne sound sensor is a vibration sensor and/or acceleration sensor. Further details will be provided below.

In one embodiment of the dry granulation system according to the third aspect comprises at least one sound sensor. In a more specific embodiment, said at least one sound sensor is a microphone.

In a fourth aspect, the invention provides a dry granulation system (sometimes shortly referred to as the machine) comprising (A2) a roller compaction unit, comprising at least two counter-rotating press rolls, the press rolls being arranged for compacting powder into ribbons and/or flakes, (B2) at least one milling unit for milling the ribbons and/or flakes into granules, comprising a rotating and/or oscillating milling roll or other milling device for breaking and reducing the size of the ribbons and/or flakes, each milling roll or milling device having a shaft, wherein the milling unit is equipped with at least one screen and an outlet, and wherein the milling roll or milling device is driven by a motor unit having an electrical drive; and (C2) at least one sensor system comprising at least one sensor located outside the electrical drive of the motor unit, said sensor being capable of measuring and transmitting a signal from which the tensile strength of the compacted material can be determined non-invasively. In one embodiment, the at least one sensor located outside the electrical drive of the motor unit may, for instance, be located at or near the milling unit; optionally comprising a sound sensor and/or a structure-borne sound sensor as described for the dry granulation system of the third aspect of the invention above; or a force sensor and/or a strain sensor.

In specific embodiments of both dry granulation systems according to both the third and the fourth aspect, the dry granulation system comprises a process housing having a frame, a front wall, a rear wall, one or more side walls (includes the top and bottom walls), and optionally devices for sampling ribbons, flakes and/or granules, and fixation parts attached to this housing for mounting it to the frame, e.g. a frame of square-type tubes to which all components of the system are attached directly or indirectly. The milling unit in this embodiment further comprises a screen support (comprising the parts required for assembling and fixing the screen), a mounting and/or suspension attachment for mounting the screen support, and a shaft on which the milling roll or other milling devices for reducing the size of ribbons and/or granules are mounted. Furthermore, the sensor—or in case of the dry granulation system of the third aspect specifically the sound sensor and/or the structure-borne sound sensor—is attached to, or positioned at or near, the front, the rear and/or the side wall (includes the top and bottom walls) of the process housing; the fixation parts attached to the process housing; the screen, the screen support and/or the mounting and/or suspension attachment(s) of the screen support; the shaft of a milling roll or other milling device, and/or the housing in which said shaft is mounted. Whilst the milling roll shaft, or the other milling device's shaft, is always part of, or present within, the milling unit, the housing of the shaft can also be located outside the milling unit, e.g. behind the rear wall of the corresponding process unit.

With regard to the attachment and/positioning of sensors, it has to be understood that not all types of sensors may be equally suited to be attached to all device components mentioned above. The respective choice may be guided depending e.g. on the sensors' measurement principle and/or its sensitivity. For instance, a sound sensor, such as a microphone, should preferably not be attached to any moving parts, like the rotating or oscillating shaft of the milling roll or other milling device because it may get damaged during the extensive movement of the milling roll or milling device and its shaft.

In one embodiment according to both the third and fourth aspect of the invention, the sensor for the dry granulation system is selected from force sensors, strain sensors, vibration sensors, acceleration sensors, pressure sensors and sound sensors. In specific embodiments of the systems, the vibration sensors and/or acceleration sensors function as structure-borne sound sensors; or in other words, structure-borne sounds may be determined with said vibration sensors and/or acceleration sensors. Similarly, the pressure sensors may function as sound sensors. In particular, sound sensors and/or structure-borne sound sensors, as favoured in, or preferably used in, the dry granulation system according to the third aspect of the invention, were found to be suitable for monitoring dry granulation processes; yet, further sensors may be selected and used in addition to said sound sensors and/or structure-borne sound sensors, for instance, force sensors and/or strain sensors.

Examples of suitable force sensors include strain gauges or straingauge based load cells. Examples of suitable strain sensors include strain gauges, straingauge based load cells and/or piezoelectric strain sensors. Examples of suitable vibration and/or acceleration sensors include piezo electric vibration and/or accelerometers based e.g. on quartz crystal, optionally miniaturized. Examples of suitable pressure sensors include microphones and pressure sensors exhibiting appropriate resolution and sensitivity, or in other words when exhibiting appropriate resolution and sensitivity to measure sound, pressure sensors may function as sound sensor. Examples of suitable sound sensors include microphones, e.g. electrical condensor microphones, moving coil microphones (also called dynamic microphones or electromagnetic microphones), or pre-polarized precision field microphones equipped with a preamplifier.

These examples are equally applicable for the dry granulation system according to the third aspect of the invention. As mentioned above, the dry granulation system according to the third aspect of the invention comprises a sound sensor (e.g. a microphone and/or a pressure sensor) and/or a structure-borne sound sensor (e.g. a vibration sensor and/or acceleration sensor) which are located at or near the milling unit, and typically outside the electrical drive of the motor unit.

In one embodiment of the third aspect of the invention, the dry granulation system further comprises a force sensor and/or a strain sensor located outside the electrical drive of the motor unit and being capable of measuring and transmitting a signal which can be used to monitor the compaction of the powder between the counter-rotating press rolls of the roller compaction unit and which is not generated by the electrical drive.

Further details with respect to, for instance, the positioning of the different sensors is provided below.

In one embodiment of the dry granulation system according to the third and fourth aspect of the invention, respectively, the sensor is selected from force sensors and strain sensors, and said force and/or strain sensor is attached to, or positioned at or near, the screen, the screen support, the mounting and/or suspension attachment(s) of the screen support; the back side or the front side of the rear wall of the process housing; and/or the shaft of a milling roll or other milling device, and/or the housing in which said shaft is mounted. In other words, according to this embodiment, the force sensors and/or strain sensors may be located at or near the milling unit.

In a specific embodiment, the force and/or strain sensor is attached to, or positioned at or near, the mounting and/or suspension attachment(s) of the screen support; and/or at the front side or the back side of the rear wall of the process housing, the latter at a distance of no more than 15 cm, or no more than 10 cm, or no more than 5 cm; and preferably of no more than 2 cm, from the mounting position of the mounting and/or suspension attachment of the screen support. If the force and/or strain sensor is positioned at the back side of the rear wall within these distances from the mounting position of the mounting and/or suspension attachment(s) of the screen support, this results in a sufficiently large sensitivity for measuring the signals caused by milling ribbons with a resolution of at least 0.1 MPa, preferably 0.05 MPa for determining the mechanical strength of ribbons reliably. In a further specific embodiment, the strain sensor is a piezoelectric based strain sensor.

As indicated above, with respect to the granulation system of the third aspect, which may comprise these force and/or strain sensors in addition to the sound sensors and/or structure-borne sensors, as mentioned above, the same provisions for the positioning of the force and/or strain sensors apply as for the fourth aspect.

In other words, in one embodiment of the dry granulation system according to the third aspect of the invention, the force and/or strain sensor is attached to, or positioned at or near, the screen, the screen support, and/or the mounting and/or suspension attachment(s) of the screen support; the back side or the front side of the rear wall of the process housing; and/or the shaft of a milling roll or other milling device, and/or the housing in which said shaft is mounted. In a specific embodiment, the force sensor and/or strain sensor is attached to, or positioned at or near, the mounting and/or suspension attachment(s) of the screen support; and/or at the front side or the back side of the rear wall of the process housing, the latter at a distance of no more than 15 cm, or no more than 10 cm, or no more than 5 cm; and preferably of no more than 2 cm, from the mounting position of the mounting and/or suspension attachment of the screen support. In a further specific embodiment, the strain sensor is a piezoelectric based strain sensor.

In alternative embodiments of the systems according to both the third and fourth aspect, respectively, the sensor is selected from vibration sensors and acceleration sensors, and said vibration and/or acceleration sensor is attached to, or positioned at or near, the screen, the screen support, the mounting and/or suspension attachment(s) of the screen support; at the shaft of a milling roll or other milling device, and/or the housing in which said shaft is mounted; and/or at the front wall, the rear wall, or the side walls of the process housing; and/or at fixation part(s) attached to the process housing, such as pieces of metal used for attaching said process housing to the frame of the dry granulation system. In other words, according to this embodiment, the vibration sensors and/or acceleration sensors may be located at or near the milling unit.

As mentioned, vibration sensors and/or acceleration sensors may function as structure-borne sound sensors and were found to be suitable for monitoring dry granulation processes; they are thus favoured in, or preferably used in, the dry granulation system according to the third aspect of the invention.

In specific embodiments of the dry granulation system according to both the third and the fourth aspect, the vibration and/or acceleration sensor is attached to the mounting and/or suspension attachment(s) of the screen support or to the screen support, and preferably to the mounting and/or suspension attachment(s). As mentioned earlier, this is advantageous since attaching them to the screen support may lead to damages of the vibration and/or acceleration sensor system more easily, because of disrupting the cables (which are part of this sensor system) upon demounting the screen support, e.g. when cleaning the milling unit of the roller compaction device. In a further specific embodiment, the vibration and/or acceleration sensor is a piezo electric vibration sensor and/or accelerometer based e.g. on quartz crystal, optionally miniaturized.

In one embodiment, the vibration sensors and/or acceleration sensors—positioned and/or attached as described above—function as structure-borne sound sensors in a dry granulation system according to the third aspect of the invention. In other words, structure-borne sounds can be determined with said vibration sensors and/or acceleration sensors. Therefore, with respect to positioning of the vibration sensors and/or acceleration sensors, the same provisions as for the system of the fourth aspect also apply to the dry granulation system of the third aspect, where said vibration sensors and/or acceleration sensors are functioning as the structure-borne sound sensors.

In other words, in one embodiment of the dry granulation system according to the third aspect of the invention, the structure-borne sound sensor is a vibration sensor and/or acceleration sensor, and wherein the vibration and/or acceleration sensor is attached to, or positioned at or near, the screen, the screen support, and/or the mounting and/or suspension attachment(s) of the screen support; the shaft of a milling roll or other milling device, and/or the housing in which said shaft is mounted; the front wall, the rear wall, or the side wall of the process housing; and/or fixation part(s) attached to the process housing. In a specific embodiment, the vibration and/or acceleration sensor is attached to the mounting and/or suspension attachment(s) of the screen support or to the screen support, and preferably to the mounting and/or suspension attachment(s). In a further specific embodiment, the vibration and/or acceleration sensor is a piezo electric vibration sensor and/or accelerometer based e.g. on quartz crystal, optionally miniaturized.

In further alternative embodiments of the dry granulation system according to the third and of the fourth aspect, the sensor is selected from sound sensors and pressure sensors, and said sound sensor and/or pressure sensor is positioned
  within the process housing below the screen, optionally within a distance of up to about 30 cm, or up to about 13 cm, from the screen support; or
  within the process housing above the screen, optionally within a distance of up to about 150 cm, or up to about 80 cm, from the screen; or
  outside the process housing within or below the outlet of the milling unit within a range of about 13 to about 60 cm from the screen and preferably at as small a distance as possible within this range, but still within or below the outlet of the process housing; and/or
  wherein the sensor is preferably positioned in such a way that it is capable of receiving unreflected and/or unattenuated sound pressure waves emitted by the screen, the screen support, the ribbons/flakes and/or the granules during the dry granulation process.

Furthermore, the sensor in this embodiment is preferably positioned in such a way that it is capable of receiving unreflected and/or unattenuated sound pressure waves emitted by the screen, the screen support and/or the ribbons/flakes and/or the granules during the dry granulation process. This is commonly achieved when working within the above described centimeter distances.

Where sound sensors are employed in the dry granulation system of the third aspect of the invention, the same positions and/or distances apply as for the system of the fourth aspect; in particular, where the sound sensor located at or near the milling unit is a microphone and/or a pressure sensor; specifically, a pressure sensor exhibiting appropriate resolution and sensitivity to measure sound and function as a sound sensor.

In other words, in a specific embodiment of the dry granulation system according to the third aspect of the invention, the sound sensor is a microphone and/or a pressure sensor, and wherein the sound sensor is positioned
  within the process housing below the screen, optionally within a distance of up to about 30 cm, or up to about 13 cm, from the screen support; or
  within the process housing above the screen, optionally within a distance of up to about 150 cm, or up to about 80 cm, from the screen; or
  outside the process housing within or below the outlet of the milling unit within a range of about 13 to about 60 cm from the screen and preferably at as small a distance as possible within this range, but still within or below the outlet of the milling unit; and/or
wherein the sound sensor is preferably positioned in such a way that it is capable of receiving unreflected and/or unattenuated sound pressure waves emitted by the screen, the screen support, the ribbons/flakes and/or the granules during the dry granulation process.

In a specific embodiment, the sound sensor and/or pressure sensor is a microphone (or in other words, when exhibiting appropriate resolution and sensitivity to measure sound, the pressure sensor may function as a sound sensor), and the microphone's base is mounted within the process housing as close as possible to the top wall and/or about 79 cm from the lowest position of the screen, with the actual position of the microphone's sensing element being about 12 cm lower. In a further specific embodiment, the sound sensor and/or pressure sensor is a pressure transducer, and the pressure transducer is mounted within the process housing at the top wall and/or about 79 cm from the lowest position of the screen.

In a specific embodiment, the sound sensor and/or pressure sensor is a microphone, and the microphone's sensing element is mounted within the process housing at a distance of at most about 80 cm away from the lowest position of the screen. In a further specific embodiment, the sound sensor or pressure sensor is a pressure transducer, and the pressure transducer is mounted within the process housing at a distance of at most about 80 cm away from the lowest position of the screen.

With regard to the terms 'unreflected' and 'unattenuated', it is to be understood, that these are referring to situations and/or arrangements in which reflection and attenuation of the sound pressure waves are limited as much as possible, such as to obtain signals during the milling process which are as large and undisturbed as possible and further as directly related to the mechanical strength of the ribbons as possible. The terms 'unreflected' and 'unattenuated' are by no means intended to imply that the sound pressure waves are not reflected and/or attenuated at all or that a correlation with the mechanical strength of ribbons exists only in case of unreflected and/or unattenuated sound waves.

In respect of the positioning of the sensor and/or sensor system described herein, it should be understood that these represent recommendations for positions, based on the inventor's experience, which result in an appropriate correlation between a measured parameter, or more specifically the related signal obtained from the sensor and/or sensor system, and the mechanical strength of ribbons. This means that even when placing a sensor at another position of a dry granulation system, this embodiment would still be considered to fall within the scope of the present invention, provided that said other position equally results in a sufficiently good correlation between the parameter measured by said sensor and the mechanical strength of ribbons.

For instance, the sound and/or pressure sensor could in theory also be placed elsewhere, such as at or near the process housing's front wall, if testing would show that a sufficiently good correlation between the measured signals and the mechanical strength of the ribbons is obtained in spite of an attenuation of the sound pressure waves by the front wall.

All of the above recommended positions and/or distances are equally applicable to, or usable in, all of the dry granulation methods and systems of the present invention, and can be freely combined with each other as long as no obvious practical considerations prevent such combinations (e.g. if it was inevitable that the cabling of one sensor would get caught in the cabling of another sensor during the dry granulation process; or the like).

In one embodiment, the dry granulation system comprises at least two sensor systems; for instance, in one embodiment of the third aspect, the dry granulation system may comprise a sound sensor and a structure-borne sound sensor. In one of the preferred embodiments, the at least two sensor systems of the dry granulation system include a sensor system comprising a sound sensor and a sensor system comprising a vibration sensor and/or acceleration sensor. The vibration sensor and/or acceleration sensor typically functions as a structure-borne sound sensor. Further optionally, a pressure sensor may function as the sound sensor. In further preferred embodiments, the at least two sensor systems include a sensor system comprising a sound sensor in the form of a microphone located at or near the milling unit, and a sensor system comprising a vibration sensor and/or acceleration sensor functioning as a structure-borne sound sensor.

In one of the preferred embodiments, the dry granulation system comprises a microphone positioned within a distance of 80 cm above the screen and an acceleration transducer mounted at the mounting and/or suspension attachment(s) of the screen support. Optionally, in addition to said microphone and said acceleration transducer, a strain sensor may be mounted at the back side of the rear wall within 2 cm from the mounting position of the mounting and/or suspension attachments of the screen support.

In one embodiment, the sensor of the dry granulation system—and in particular the sound sensor and structure-borne sound sensor favoured in, or preferably used in, the system of the third aspect of the invention—is capable of measuring and transmitting a signal arising from milling the ribbons and/or flakes into granules using the milling unit, and from which signal the tensile strength of the compacted material can be determined non-invasively; for instance, from airborne and/or structure-borne sound signals which may be measured and transmitted using respective sound and/or structure-borne sound sensors.

In specific embodiments of both dry granulation systems according to the third and the fourth aspect, the dry granulation system further comprises a gap width measurement device and/or a roll speed measurement device. In further specific embodiments, the system comprises a gap width measurement device and a roll speed measurement device. Using the gap width- and roll speed measurement devices, the volume flow can be determined. Optionally, the system may further be equipped with a scale, preferably a computer-connectable scale which can be positioned at the outlet of the system's milling unit in order to determine the amount, or mass, of granules leaving the milling system per unit of time, as a surrogate value for the mass flow of ribbons/flakes.

In one embodiment, the counter-rotating press rolls of the dry granulation system are adapted to be operated at a roll speed, a gap width, and a roll force which is exerted onto the powder between the rolls, and the dry granulation system is adapted to adjust the roll force and/or the gap width whilst conducting a dry granulation process in response to the signals obtained from the at least one sensor system. In particular, the dry granulation system according to the third aspect is adapted to adjust the roll force and/or the gap width whilst conducting a dry granulation process in response to the signals obtained from the sound sensor and/or the structure-borne sound sensor. For the embodiments of the dry granulation system of the third aspect which comprise a force sensor and/or a strain sensor in addition to the sound sensor and/or the structure-borne sound sensor, the dry granulation system may furthermore be adapted to adjust the roll force and/or the gap width whilst conducting a dry granulation process in response to the signals obtained from the sound sensor and/or the structure-borne sound sensor, and the signals obtained from the force sensor and/or the strain sensor.

The inventive dry granulation systems of both the third and the fourth aspect of the invention will now be explained in further detail with the help of FIG. 1. In this figure, within a process housing (1), a press roll (2) and a press roll (2.1) are schematically shown. Below the press roll (2) and the press roll (2.1), a milling roll (3) (also called granulator, or rotor), mounted on a shaft (3.1), is arranged. Around the milling roll (3), a screen support (3.2) equipped with a screen (3.3) with a given aperture size, or sieve size, is mounted.

With a force measurement device (4), the force applied onto the powder by the press rolls (2, 2.1), the so-called roll force, is determined. The smallest distance between the press rolls (2, 2.1), the so-called gap width (5), is determined with the gap width measurement device (5.1); whereas the speed with which the press rolls (2, 2.1) are rotating, the so-called roll speed, is measured with the roll speed measurement device (2.2).

As mentioned, the invention is based on the discovery that the compaction of powders between the counter-rotating press rolls of a roller compaction unit may be monitored; and in particular, the mechanical strength of ribbons (preferably the tensile strength, expressed in MPa or N/mm$^2$) during a roller compaction process may be determined surprisingly well by measuring and analyzing parameters such as:

a) the forces applied to
   the screen (3.3) of the milling unit, the support used for mounting the screen (also referred to as the screen support (3.2)), the mounting and/or suspension attachments of the screen support (not shown in FIG. 1), and/or the walls, used for assembling the mounting devices and/or the suspension supports of the screen support, and/or
   the milling roll (3) or other milling device, and/or the shaft (3.1) on which the milling roll or milling device is mounted, using a force sensor and/or a strain sensor;
   and/or b) the structure-borne sound with a vibration and/or acceleration transducer (7, 7.1, 7.2, 7.3, 7.4 and 7.5), which is attached to, or positioned at or near,
   the screen support (3.2) of the milling unit, and/or the mounting and/or suspension attachments of the screen support (not shown in FIG. 1), and/or
   other machine parts in contact with the screen support (3.2) or its mounting and/or suspension attachments, such as at the inside walls of the process housing (1), or even at its outside walls,
   and/or c) the airborne sound, usually with a sound sensor (e.g. a microphone) and/or a pressure transducer (8, 8.1, 8.2, 8.3 and 8.4) which is attached to, or positioned at, an appropriate distance to the screen (3.3) and/or the screen support (3.2) and/or the milling roll (3) of the milling unit, be it within the process housing (1), or below the outlet of the milling unit, or at the outside of the process housing (1), whilst the ribbons are milled in the milling unit. In other words, the dry granulation process may be monitored—in particular, monitored non-invasively during the roller compaction process and with respect to the tensile strength of the ribbons/flakes—using sensors located at or near the milling unit of the dry granulation system.

The forces applied to the screen support (3.2) during the ribbons milling process, or the fluctuations thereof, may be measured with force measurement transducers (6, 6.1, 6.2 and 6.3), for instance with strain measurement devices. These transducers are mounted in such a way that they measure, directly or indirectly, the forces applied to the screen support (3.2) or the screen (3.3) itself; e.g. by being placed at the mounting and/or suspension attachments of the screen support (not shown in FIG. 1). Alternatively, or in addition, these transducers may be mounted in such a way that they measure, directly or indirectly, the forces applied to the milling roll (3), or other milling device, and/or the shaft (3.1) on which the milling roll is mounted. The measured forces are then converted, or translated, into electric signals, such as electrical resistance in a strain gauge, or electrical charge in a piezo transducer, or the changes thereof in response to the forces applied. This electric signal is then transmitted to e.g. a computer for data storage and analysis.

Force measurement instrumentation may be performed with commercially available transducers, like e.g. load cells or load washers and/or by applying strain gauges or other measurement devices (like e.g. piezo transducers like piezo based strain sensors) at one or more of the above-mentioned parts of the dry granulation system. All these measurement systems (symbolized with 6, 6.1, 6.2, 6.3 and 6.4 in FIG. 1) are denominated collectively as force measurement transducers, irrespective of their physical measurement principle and irrespective whether the deformation to be determined corresponds to a positive or a negative strain.

The vibrations of the screen support (3.2) arising from milling/breaking the ribbons may be measured with structure-borne sound sensors (7, 7.1, 7.2, 7.3, 7.4 and 7.5), for instance vibration and/or acceleration transducers, which are mounted in such a way that they are measuring, directly or indirectly, the vibrations of the screen support (3.2); e.g. by being placed at the mounting and/or suspension attachments of the screen support (not shown in FIG. 1) and/or at appropriate positions of the process housing.

Preferably, the vibration and/or acceleration sensors are attached to the mounting and/or suspension attachments of the screen support. As mentioned earlier, this is advantageous since attaching them to the screen support may lead to damages of the vibration and/or acceleration sensor system more easily, because of disrupting the cables (which are part of this sensor system) upon demounting the screen support, e.g. when cleaning the milling unit of the roller compaction device.

The airborne sound arising from the milling unit and the ribbons/flakes whilst being reduced in size is determined with appropriately positioned airborne sound sensors (8, 8.1, 8.2, 8.3), usually called sound sensors herein, for instance microphones and/or pressure transducers.

The above-mentioned force-, structure-borne and airborne sensors may also be attached to, or positioned at or near, the rear wall (not visible in FIG. 1) of the process housing (1), either at the front side and/or at the back side. Furthermore, they can be attached to, or positioned at or near, the shaft (3.1) on which the milling roll (3) is mounted or the housing of this shaft (its housing not being visible in FIG. 1).

Furthermore, these sensors cannot only be mounted within the process housing (1) or at its walls, but depending of their measurement principle, also outside this process housing. As mentioned above, the main requirement for the positioning of the sensors and/or sensor systems is that it results in a sufficiently good correlation between the parameter measured by said sensor and/or sensor system and the mechanical strength of ribbons.

Below the screen support (3.2), a drum (9) is placed for collecting the dry granulate. This drum (9) is positioned at a scale (10) which is directly connected to a computer (11) via an appropriate interface, as symbolized by the collector line (15) in FIG. 1. From the scale signal (which is used for determining the amount of ribbons being milled per unit of time and which under steady state conditions is a surrogate parameter for these ribbons' mass flow), in combination with one or more signal(s) of the measurement devices (2.2) and (5.1) for determining roll speed and gap width, respectively, the apparent at-pressure density of the ribbons compacted between the press rolls (2, 2.1), whilst correcting for the additional volume of non-smooth roll surfaces, is determined and recorded.

Further, an A/D-converter (16) is connected to a computer (11). Alternatively, i.e. instead of via an A/D-converter, signals may be connected to the computer or to a corresponding dedicated signal evaluation/data analysis unit using connecting systems like e.g. can bus, profibus or profinet electronics. In other words, it is irrelevant for the inventive system and method, in which manner the signals are connected to the computer, or a similar dedicated signal evaluation/data analysis unit.

The signals from the force measurement transducers (6, 6.1, 6.2 and 6.3; e.g. strain measurement devices), the structure-borne sound sensors (7, 7.1, 7.2, 7.3, 7.4 and 7.5; e.g. vibration and/or acceleration transducers) as well as the airborne sound sensors (8, 8.1, 8.2, 8.3 and 8.4; e.g. microphones and/or pressure transducers) are connected to and sampled by the A/D-converter (16), either directly or after combining the signals from two or more force sensors with each other (or respectively from two or more structure-borne sound sensors, or two or more airborne sound sensors). This is symbolized in FIG. 1 by the collector lines (12), (13) and (14), respectively.

It should be understood that not all of the depicted measurement sensors and transducers (numbers 6 to 8.4) actually have to be installed in order to determine the signals correlating to the mechanical ribbon strength. Depending on the design of the dry granulation equipment and the exact measurement position, one measurement sensor or a combination of two or three measurement sensors may be enough.

In summary, the inventive dry granulation system obtains and transmits mechanical strength-related signals from the sensor and/or sensor system (numbers 6 to 8.4 and 12, 13, 14 in FIG. 1), as well as roll force and gap width signals (numbers 2.2 and 5.1 in FIG. 1) as well as 'scale signals' (or in other words mass flow signals; refer to scale 10 and collector line 15 in FIG. 1). The mechanical strength related signals, in combination with the roll force, gap width, or more precisely the effective gap width, and scale signals, are continuously received and evaluated by the correspondingly programmed computer (11) such that—in case of a deviation from the set value beyond allowable limits—the control system (re)adjusts the tensile strength of the ribbons to its set value, preferably by adapting the roll force (2, 2.1 and force measuring device 4 in FIG. 1), and where considered expedient, also the width of the gap width (5 and gap width measuring device 5.1 in FIG. 1) and/or the roll speed (2, 2.1 and roll speed measuring device 2.2 in FIG. 1), whilst also determining the at pressure ribbon density.

Furthermore, all signals as well as characteristic numbers calculated from these signals (like e.g. the tensile strength and/or the at-pressure density of the ribbons) are recorded as a function of (production) time and at the end of each batch stored as fraud resistant PDF files as part of the batch manufacturing documentation. Hence, simultaneously establishing the tensile strength and the at-pressure density of the ribbons with the above described measurement method(s) and system(s) and controlling the ribbon strength (e.g. by adapting the roll force), does enable the manufacturer to prove that no quality relevant fluctuations occurred during the production of the dry granulate.

Figure 2:
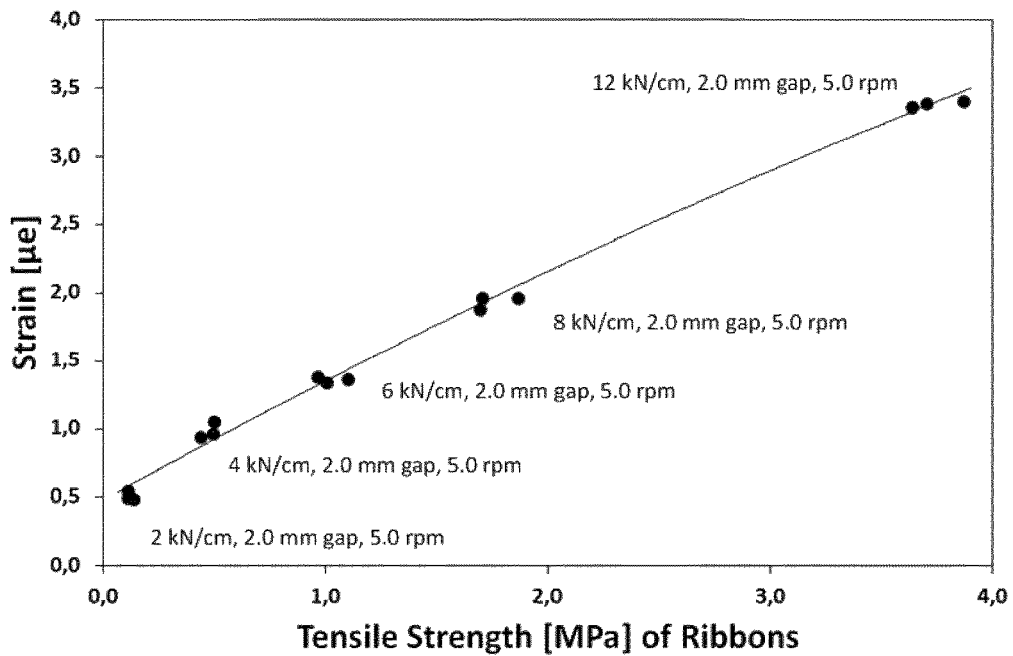
FIG. 2 shows a graph correlating the tensile strength of ribbons made at various roll forces (X-axis) and the signals from a given strain sensor system (Y-axis).
Figure 3:
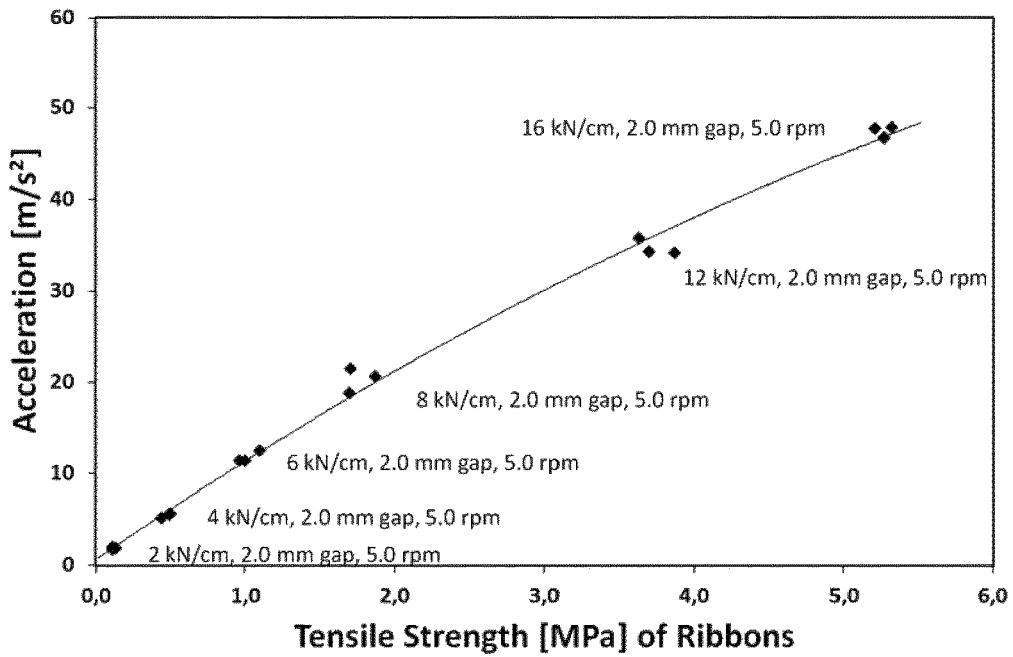
FIG. 3 shows a graph correlating the tensile strength of ribbons made at various roll forces (X-axis) and the signals from a given acceleration sensor system (Y-axis).
Figure 4:
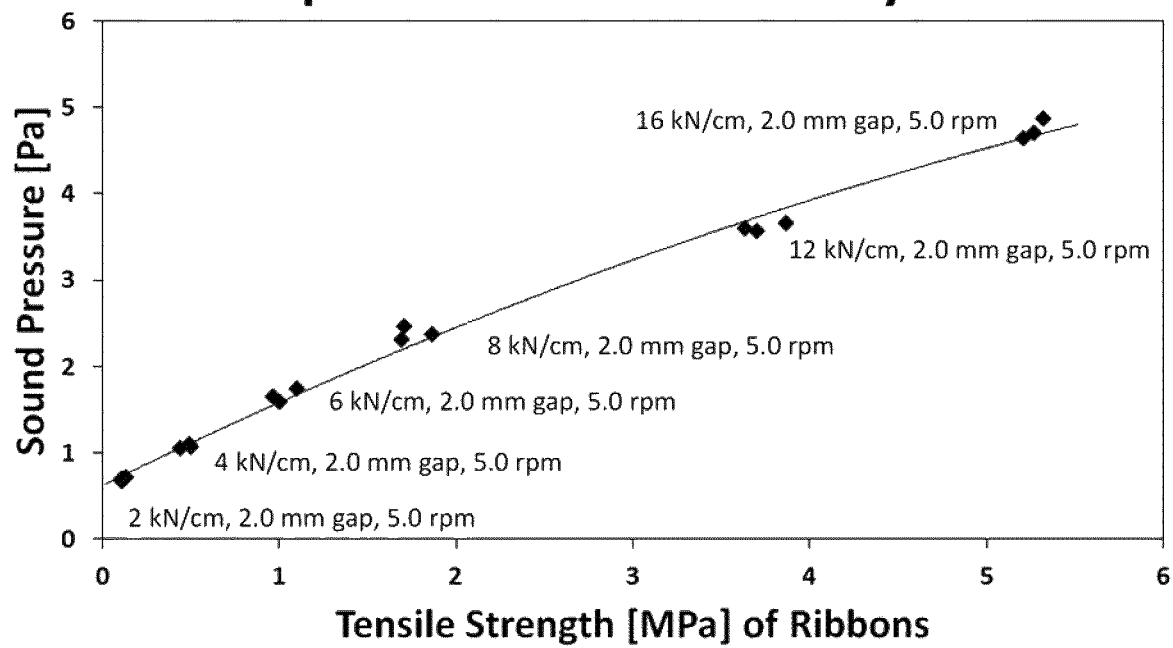
FIG. 4 shows a graph correlating the tensile strength of ribbons made at various roll forces (X-axis) and the signals from a given microphone based sensor system (Y-axis).

Typical examples of the signals obtained from the at least one sensor and/or sensor system during the milling of ribbons of a given powder with the milling roll (3) are provided in FIGS. 2 to 4, which clearly show how well the tensile strength of the ribbons correlates with signals obtained from strain measurement transducers (i.e. strain sensors; FIG. 2), from structure-borne sound sensors (FIG. 3), and from airborne sound sensors (in particular, microphones; FIG. 4). In these figures, the X-axis represents the tensile strength of ribbons made by varying the roll force at the same gap width and roll speed and granulating conditions; whereas the Y-axis of the graphs represents the signals obtained from a given strain measurement device (i.e. strain sensor; FIG. 2), or from a given acceleration transducer (FIG. 3), or from a given type of sound sensor/microphone (FIG. 4), respectively. The roller compaction parameter for each of these Figures is shown in the corresponding graph. With respect to the exemplary graphs depicted in FIGS. 2 to 4, it should be understood that, while said graphs show experiments performed at a gap width of 2 mm at a roll speed of 5 rpm, the invention is by no means limited to said parameters, and similar correleations as those depicted are, of course, obtainable with other gap widths and roll speeds.

Depending on the type of measurement instrumentation (e.g. sensor(s) for airborne sound, structure-borne sound, strain and/or force), the related signals obtained from the sensor system may need to be corrected with regard to parameters having an influence on the milling process, such as the gap width and/or the roll speed. Both have an influence on the amount of granules made per unit of time, in other words the mass flow. Furthermore, the screen apertures (i.e. the sieve size), the distance between the milling roll, or other milling device, and the screen, the type of screen being used (e.g. square wire screens, spring wire screens, conidur screens), and the degree of wear of the screen, as well as the speed with and the angle over which the milling roll, or other milling device, is moving, may all have an influence on the signals obtained from the sensor system. In general, the extent of these influences is small compared to ribbon strength-related signals, but whether these influences have to be corrected for, depends on their actual magnitude and its influence on the value of the ribbon strength, as calculated from the ribbon strength measurement.

In a further aspect, the invention provides the use of a sound sensor and/or a structure-borne sound sensor for monitoring a dry granulation process. With respect to the sound sensor and/or the structure-borne sound sensor, any of the provisions described for the dry granulation method and/or the dry granulation system relating to the sensors shall equally apply for the use of said sensors for monitoring a dry granulation process. In one embodiment, the invention provides the use of a sound sensor and/or a structure-borne sound sensor for monitoring a dry granulation process comprising a compaction step; for instance, a roller compaction step such as roller compaction of powders between two counter-rotating press-rolls. Optionally, two or more sound sensors or structure-borne sound sensors may be used for monitoring the dry granulation process. Further optionally, a force sensor and/or a strain sensor may be used in addition to the sound sensor(s) or the structure-borne sound sensor(s) to monitor the dry granulation process.

In one of the preferred embodiments of this aspect, the invention provides the use of a sound sensor and/or a structure-borne sound sensor for monitoring and controlling the dry granulation process; in other words, the sound sensor(s) or structure-borne sound sensor(s), or more precisely the signal(s) obtained therefrom, are not only used to monitor the dry granulation process but also to control, or regulate, said process in response to the signals monitored, preferably automatically. In that regard, it should be remembered that within the scope of the present invention, the controlling of said dry granulation process occurs concurrently with, or in other words at the same time as, the monitoring, or intermittently with the monitoring. This means that the dry granulation process is being controlled, or regulated, already while it is running (e.g. during the compaction and the milling of the compacted ribbons/flakes into granules), rather than e.g. a separate, later dry granulation process being controlled in response to the sensor signals monitored in an earlier ribbon/flake manufacturing process, or dry granulation process.

In one of the further preferred embodiments of this aspect, the monitoring of step (a1) comprises non-invasively determining the tensile strength of the compacted material using a signal obtained from a sound sensor and/or a structure-borne sound sensor located at or near the milling unit.

In a yet further aspect, the invention is directed to the use of the above described dry granulation systems for manufacturing granules from a powder; for instance, the dry granulation system according to the third aspect of the invention. In one embodiment, the powder exhibits an intra-batch or batch-to-batch variability of its compaction properties, such as compressibility and bondability, which are relevant for manufacturing granules within the quality relevant range.

In a yet further aspect, the invention provides granules obtained by the above described dry granulation method(s), i.e. the methods according to the first and/or the second aspect of the invention.

In a final aspect, the invention provides a method of calibrating the sensor and/or sensor system of the above described dry granulation system (for instance, a sound sensor system and/or a structure-borne sound sensor system), wherein tablets of known tensile strength, or fragments thereof (e.g. tablets cut or broken into smaller particles such as halves, quarters, granules etc.), are milled in the milling unit of the dry granulation system, and wherein the signals obtained from the sensor and/or sensor system upon milling are determined and analysed in order to perform a calibration and/or to establish a calibration curve. When working with tablet fragments, it is to be understood that the size of these fragments—at least for a majority of them (e.g. 90 wt.-% or more—has to be large enough for them to be subjected to an actual milling step when passing the screen; or in other words they should not be so small that they pass the screen unmilled. A finepowder fraction of about 10 wt.-% or smaller, which passes the screen unmilled, is typically unproblematic, though.

To this end, conventional tablets may be prepared, e.g. at a single punch or rotary tablet press and the tensile strength of the tablets determined by state of the art methods; e.g. by measuring the force required for crushing the tablets or their fragments between two plates (i.e. an invasive and destroying material test), and then calculating the tensile strength from the crushing force and the dimensions of the tablet or tablet fragments. Once the tensile strength of the tablets is known, they can be milled in the milling unit of the dry granulation system, as if they were ribbons exiting the press rolls, whilst determining and analysing the signals obtained from the at least one sensor system. Alternatively, the tablets of known tensile strengths may be broken or cut into fragments with the help of a milling device like e.g. cutting mills or blade granulators, and then these fragments of the same known tensile strength can be milled in the milling unit of the dry granulation system. Further alternatively, the tablets of known tensile strengths may be broken into fragments with the help of the dry granulation system's milling unit using a screen with an aperture size larger than that intended for the milling step; for instance, breaking the tablets of known tensile strengths into fragments with a 4 mm screen, and then milling the tablet fragments in the same milling unit but using a screen of 1 mm aperture size. Thereby a correlation, or calibration curve, is established between the known tensile strength of the tablets or their fragments and the related sensor signals obtained upon milling them in the dry granulation system.

One reason why such calibration is typically advisable, or necessary, is because the means with which the sensor is attached or positioned in its appropriate position may also influence the sensor; for instance, to what extent the sensor may vibrate. In other words, the machine parts at which sensors are attached or their exact position within the dry granulation system may have an influence on the signals generated by the various sensors. For instance, the extent to which a structure borne sensor like a vibration sensor will vibrate depends on how the machine part at which it is mounted vibrates; likewise, the signal measured by a sound sensor like e.g. a microphone likely depends on its exact mounting position.

Such calibration of the sensor and/or sensor system is also possible with other compacts; e.g. by collecting ribbons prepared with the dry granulation system and then determining their tensile strength with a separate device, such as a tablet hardness tester (e.g. tablet hardness distribution tester type TH-3, Yamato Scientific Co. Ltd., Tokyo, Japan) equipped with a dedicated rotary cutter, also called circular mill). However, the above calibration method using tablets instead is considered more beneficial because tablets can easy the prepared and stored, and their tensile strength can easily be determined and is usually stable during storage, if controlled humidity and temperature conditions are maintained, e.g. 40% relative humidity and 25° C.

In case of extended storage periods of the calibration tablets or their fragments, it may be advisable to test the tensile strength again prior to using the tablets or their fragments for calibrating the sensor and/or sensor system, and thereby to either reconfirm the earlier known tensile strength value, determine a new value for the calibration, or to discard the tablets or their fragments if they are not suited for calibration purposes anymore (e.g. if their tensile strength has decreased too much).

The invention claimed is:

1. A continuous dry granulation method comprising the steps of:
   (a1) compacting a powder between counter-rotating press rolls in a roller compaction unit, to obtain a compacted material in the form of ribbons, flakes, or a combination thereof;
   (b1) milling the compacted material obtained in step (a1) with a milling unit comprising a milling device, and a screen to obtain granules, wherein the milling device is driven by a motor unit having an electrical drive;
   (c1) monitoring the mechanical strength of the compacted material obtained in step (a1) using signals obtained from a sound sensor system during milling, wherein the sound sensor system comprises an airborne sound sensor, a structure-borne sound sensor, or a combination thereof, and wherein the sound sensor system is located at or near the milling unit;
   wherein steps (a1) and (b1) are conducted concurrently, and wherein step (c1) is conducted concurrently or intermittently with steps (a1) and (b1).

2. The dry granulation method of claim 1, wherein the sound sensor system is located outside the electrical drive of the motor unit.

3. The dry granulation method of claim 2, wherein the monitoring of the mechanical strength of the compacted material further comprises determining an at-pressure volume flow and a mass flow of the compacted material obtained in step (a1), the granules obtained in step (b1), or a combination thereof and non-invasively determining a tensile strength of the compacted material, the granules, or a combination thereof using the signal obtained from the sound sensor system.

4. The dry granulation method of claim 3, wherein the monitoring of the mechanical strength of the compacted material further comprises determining an apparent at-pressure-density of the compacted material concurrently with steps (a1), (b1) and (c1).

5. The dry granulation method of claim 3, wherein the signals obtained from at least two sensors during milling are used for non-invasively determining the tensile strength of the compacted material, the granules, or a combination thereof.

6. The dry granulation method of claim 1, wherein the counter-rotating press rolls are operated at a roll speed, a gap width, and a roll force which is exerted onto the powder between the rolls, and wherein the roll force, the gap width, or a combination thereof are optionally adjusted whilst conducting steps (a1) to (c1) in response to the signals obtained in step (c1) during milling to obtain or maintain a target range for the mechanical strength of the compacted material.

7. The dry granulation method of claim 1, wherein the monitoring of the mechanical strength of the compacted material comprises using a signal obtained from an airborne sound sensor and a structure-borne sound sensor.

8. The dry granulation method of claim 1, wherein the airborne sound sensor is a microphone, a pressure sensor, or a combination thereof; and wherein the structure-borne sound sensor is a vibration sensor, an acceleration sensor, or a combination thereof.

9. The dry granulation method of claim 1, wherein the monitoring of the mechanical strength of the compacted material further comprises using a signal obtained from a force sensor, a strain sensor, or a combination thereof; wherein the force sensor, the strain sensor, or combination thereof is located outside the electrical drive of the motor unit and the signal is not generated by the electrical drive.

10. The dry granulation method of claim 1, wherein the milling device is a rotating milling roll, an oscillating milling roll or a combination thereof.

11. A dry granulation system comprising:
   (a1) a roller compaction unit, comprising at least two counter-rotating press rolls, the press rolls being arranged for compacting a powder into a compacted material in the form of ribbons, flakes, or a combination thereof, (b1) at least one milling unit for milling the compacted material into granules, comprising a milling device for breaking and reducing a size of the compacted material, at least one screen, and an outlet, wherein the milling device comprises a shaft and a motor unit having an electrical drive; and (c1) a sound sensor system, wherein the sound sensor system comprises an airborne sound sensor, a structure-borne sound sensor, or a combination thereof, wherein the sound sensor system is located at or near the milling unit, and wherein the sound sensor system is configured to measure and transmit a signal during milling that is used to monitor the compaction of the powder between the counter-rotating press rolls of the roller compaction unit.

12. The dry granulation system of claim 11, wherein the sound sensor system is located outside the electrical drive of the motor unit.

13. The dry granulation system of claim 11, wherein
the dry granulation system comprises a process housing having a frame, a front wall, a rear wall, one or more side walls, and optionally devices for sampling the compacted material, the granules, or combinations thereof, and fixation parts attached to the process housing for mounting it to the frame; and
the milling unit further comprises a screen support, a mounting attachment for mounting the screen support and a shaft on which the milling devices are mounted; and wherein the airborne sound sensor, the structure-borne sound sensor, or a combination thereof is attached to, or positioned at or near, at least one of:
the front wall, the rear wall or the one or more side walls of the process housing,
the fixation parts attached to the process housing,
the screen, the screen support, or the mounting attachment(s) of the screen support, and
the shaft of the milling device, or a housing in which said shaft is mounted.

14. The dry granulation system of claim 13, wherein the airborne sound sensor is a microphone, a pressure sensor, or a combination thereof, and wherein the airborne sound sensor is positioned
within the process housing below the screen, within a distance of 30 cm or less, or 13 cm or less, from the screen support; or
within the process housing above the screen, within a distance of 150 cm or less, or 80 cm or less, from the screen; or
outside the process housing within or below the outlet of the milling unit within a range of 13 to 60 cm from the screen.

15. The dry granulation system of claim 14, wherein the airborne sound sensor is positioned in such a way that it is capable of receiving unreflected and unattenuated sound pressure waves emitted by the screen, the screen support, the compacted material, and the granules during the dry granulation process.

16. The dry granulation system of claim 13, wherein the structure-borne sound sensor is a vibration sensor, an acceleration sensor, or a combination thereof, and wherein the vibration sensor, the acceleration sensor, or the combination thereof is attached to, or positioned at or near, at least one of:
the screen, the screen support, or the mounting attachment(s) of the screen support,
the shaft of the milling device, or a housing in which said shaft is mounted,
the front wall, the rear wall, or the one or more side walls of the process housing, and
the fixation part(s) attached to the process housing.

17. The dry granulation system of claim 16, wherein the vibration sensor, the acceleration sensor, or a combination thereof is attached to the mounting attachment(s) of the screen support or to the screen support.

18. The dry granulation system of claim 17, wherein the vibration sensor, the acceleration sensor, or a combination thereof is attached to the mounting attachment(s) of the screen support.

19. The dry granulation system of claim 11, further comprising a force sensor, a strain sensor, or a combination thereof located outside the electrical drive of the motor unit and being capable of measuring and transmitting a signal that is used to monitor the compaction of the powder between the counter-rotating press rolls of the roller compaction unit, wherein the signal is not generated by the electrical drive.

20. The dry granulation system of claim 19, wherein the force sensor, the strain sensor, or the combination thereof is attached to, or positioned at or near, at least one of:
the screen, the screen support, or the mounting attachment(s) of the screen support,
the back side or the front side of the rear wall of the process housing, and
the shaft of the milling device, or a housing in which said shaft is mounted.

21. The dry granulation system of claim 20, wherein the force sensor, the strain sensor, or the combination thereof is attached to, or positioned at or near at least one of:
the mounting attachment(s) of the screen support; and
the front side or the back side of the rear wall of the process housing;
wherein when a sensor is attached to or positioned at or near the front side or the back side of the rear wall of the process housing, the sensor is 15 cm or less, or 10 cm or less, or 5 cm or less from a mounting position of the mounting attachment(s) of the screen support.

22. The dry granulation system of claim 20, wherein when a sensor is attached to, or positioned at or near the front side or the back side of the rear wall of the process housing, the sensor is no more than 2 cm from a mounting position of the mounting attachment of the screen support.

23. The dry granulation system of claim 19, wherein the counter-rotating press rolls are adapted to operate at a roll speed, a gap width, and a roll force which is exerted onto the powder between the rolls, and wherein the dry granulation system is adapted to adjust the roll force, the gap width, or a combination thereof whilst conducting a dry granulation process in response to the signals obtained during milling from the airborne sound sensor, the structure-borne sound sensor, the force sensor, the strain sensor, or combinations thereof.

24. The dry granulation system of claim 11 comprising an airborne sound sensor and a structure-borne sound sensor.

25. The dry granulation system of claim 11, further comprising a gap width measurement device, a roll speed measurement device, or a combination thereof.

26. The dry granulation system of claim 11, wherein the counter-rotating press rolls are adapted to operate at a roll speed, a gap width, and a roll force which is exerted onto the powder between the rolls, and wherein the dry granulation system is adapted to adjust the roll force, the gap width, or a combination thereof whilst conducting a dry granulation process in response to the signals obtained upon from milling from the airborne sound sensor, the structure-borne sound sensor, or a combination thereof.

27. The dry granulation system of claim 11, wherein the milling device is a rotating milling roll, an oscillating milling roll, or a combination thereof.

28. A method of calibrating the sound sensor system in the dry granulation system according to claim 11, the method comprising:
- obtaining tablets of a known tensile strength, or tablet fragments thereof,
- milling the tablets in the milling unit of the dry granulation system, and
- analysing the signals obtained from the sound sensor system upon milling in order to perform a calibration and establish a calibration curve.

* * * * *